United States Patent [19]

Buma et al.

[11] Patent Number: 5,159,554
[45] Date of Patent: Oct. 27, 1992

[54] ELECTRONIC CONTROLLED FLUID SUSPENSION SYSTEM

[75] Inventors: Shuuichi Buma; Nobutaka Ohwa, both of Toyota; Osamu Takeda, Susono; Toshio Aburaya, Toyota, all of Japan

[73] Assignee: Toyota Jidosha Kabushiki Kaisha, Toyota, Japan

[21] Appl. No.: 213,766

[22] Filed: Jun. 30, 1988

[30] Foreign Application Priority Data

Jul. 6, 1987 [JP] Japan .................. 62-103539
Jul. 22, 1987 [JP] Japan .................. 62-112411

[51] Int. Cl.$^5$ .......................... B60G 17/01
[52] U.S. Cl. .............. 364/424.05; 280/707; 280/703
[58] Field of Search ........ 364/424.05, 424.01; 280/707, 708, 703, 709, 711

[56] References Cited

U.S. PATENT DOCUMENTS

| | | | |
|---|---|---|---|
| 4,568,101 | 2/1986 | Bleustein et al. | 280/707 |
| 4,624,477 | 11/1986 | Kumagai et al. | 280/707 |
| 4,635,906 | 1/1987 | Buma | 280/707 |
| 4,712,807 | 12/1987 | Kurasawa | 364/424.05 |
| 4,852,906 | 8/1989 | Buma et al. | 280/707 |
| 4,869,528 | 9/1989 | Buma et al. | 280/707 |
| 4,888,696 | 12/1989 | Akatsu et al. | 364/424.05 |
| 4,897,776 | 1/1990 | Urababa et al. | 280/707 |
| 4,903,983 | 2/1990 | Fukushima et al. | 364/424.05 |
| 4,924,392 | 5/1990 | Kurosawa | 364/424.05 |

FOREIGN PATENT DOCUMENTS 61-64512 of 0000 Japan.
60-119631 of 0000 Japan.

Primary Examiner—Vincent N. Trans
Attorney, Agent, or Firm—Oliff & Berridge

[57] ABSTRACT

An electronic fluid suspension system having longitudinal acceleration sensor, acceleration difference calculation means and vehicle attitude control means in addition to other fluid flow control components known in the conventional suspension system. In this system, the vehicle attitude is controlled responsive to the difference between a maximum acceleration and a minimum acceleration detected within a predetermined time interval. When dive or squat of the vehicle body is anticipated by the difference, vehicle attitude control is performed, without inappropriately responding to a momentary change in the acceleration. After the vehicle attitude control, a return control is performed to restore the original attitude and, further, a vehicle attitude correction control is performed responsive to a difference in actual front/rear heights and corresponding original heights.

14 Claims, 18 Drawing Sheets

PFH/(P4FL or P4FR)
PFH: FRONT HIGH PRESSURE RESERVE TANK
    PRESSURE
P4FL, P4FR: MAIN AIR CHAMBER PRESSURES

AT REAR LOW PRESSURE RESERVE TANK
(P4RL or P4RR)/PRL
P4RL, P4RR: MAIN AIR CHAMBER PRESSURES
PRL: REAR LOW PRESSURE RESERVE TANK
       PRESSURE

ELECTRONIC CONTROLLED FLUID SUSPENSION SYSTEM

BACKGROUND OF THE INVENTION

This invention relates to an electronic controlled fluid suspension system for controlling vehicle attitude.

In general, when a vehicle is started and accelerated, squat of the vehicle body occurs, when decelerated and stopped, on the other hand, dive of the body occurs. To cope with such phenomena and to improve ride comfort and maneuverability of the vehicle, various types of electronic controlled suspension systems for controlling inclination of the vehicle body due to the squat and the dive of the body have been developed. One of those suspension systems has been disclosed in Japan published unexamined utility model application No. 60-119631. In this prior art, when a braking deceleration exceeds a predetermined value G1, control valves are opened for a predetermined time interval to maintain a horizontal vehicle attitude. When the braking deceleration becomes lower than another predetermined value G2, another set of control valves are opened for the aforementioned time interval so as to execute the so-called return control, i.e., a reversing attitude control. Another type of electronic controlled suspension system has been disclosed in Japan published unexamined patent application No. 61-64512, in which characteristic of the suspension is changed in several stages according to the detected acceleration.

These prior art systems, however, still include some problems in the maintenance of ride comfort and maneuverability of the vehicle. For example, the prior art suspension systems cannot effect appropriate control corresponding to various braking operations, e.g., light-touch braking, deep braking or sudden braking. When the acceleration (deceleration) exceeds a predetermined level, the same prescribed control is carried out irrespective of braking conditions so that ride comfort and maneuverability controls are sometimes insufficient. On the other hand, when the suspension characteristic is determined according to the amount of acceleration, the control system is apt to respond to even a momentary change in the acceleration. As a consequence, execution of accurate control considering every changing manner of the acceleration and deceleration may be difficult, and accordingly ride comfort and maneuverability of the vehicle may be hard to realize.

The conventional return control also involves some shortcomings. When the return control is executed by following the process opposite to the vehicle attitude control, the control time interval t is determined by an estimation so that the vehicle attitude is not necessarily returned to the original state with accuracy. On the other hand, when the return control is executed by communicating air springs of front and rear wheels, much time is required for restoring the vehicle attitude since the speed of the air flow between the air springs becomes slower as the pressure difference between the air springs becomes smaller.

SUMMARY OF THE INVENTION

An object of the present invention is to solve the above-mentioned problems and to provide an electronic controlled fluid suspension system realizing quick-responsive and accurate attitude control and providing improved ride comfort and maneuverability of the vehicle.

Another object of the present invention is to provide an electronic controlled fluid suspension system in which the vehicle attitude is accurately and quickly controlled to restore the original state, whereby the ride comfort and maneuverability of the vehicle are improved.

To achieve these and other objects, the present invention has a constitution set forth as follows. Namely, the electronic controlled fluid suspension system of the present invention includes: a fluid suspension M2 provided for a wheel M1 of the vehicle; flow control means M3 for controlling fluid flow to and from the fluid suspension M2 based on a control parameter; acceleration detection means M4 for detecting a longitudinal acceleration of the vehicle; difference calculation means M5 for calculating a difference between a maximum and a minimum value of the detected longitudinal acceleration during a predetermined time interval; and attitude control means M6 for generating the control parameter based on the difference calculated in the difference calculation means M5 in order that an attitude of the vehicle is controlled to approach a predetermined target attitude.

The fluid suspension system of the present invention may further include: return control means for generating a return control parameter that has an effect opposite to that of the control parameter on the flow control means M3 in order that an attitude of the vehicle is controlled to approach an original vehicle attitude after the vehicle attitude is controlled to approach the target vehicle attitude; vehicle height detection means for detecting vehicle heights at the front part and the rear part of the vehicle; and attitude correction control means for generating a correction control parameter when the detected longitudinal acceleration is less than a second predetermined value, the second predetermined value being smaller than the predetermined value, the correction control parameter being determined based on differences between the detected front-/rear vehicle heights and corresponding vehicle heights at the original vehicle attitude in order to effect the flow control means M4 to completely return the attitude of the vehicle to the original vehicle attitude.

BRIEF DESCRIPTION OF THE DRAWINGS

By way of example and to make the description clearer, reference is made to accompanying drawings in which.

DETAILED DESCRIPTION OF PREFERRED EMBODIMENTS

Set forth is the explanation of an embodiment of the present invention based on the attached drawings.

Figure 1:
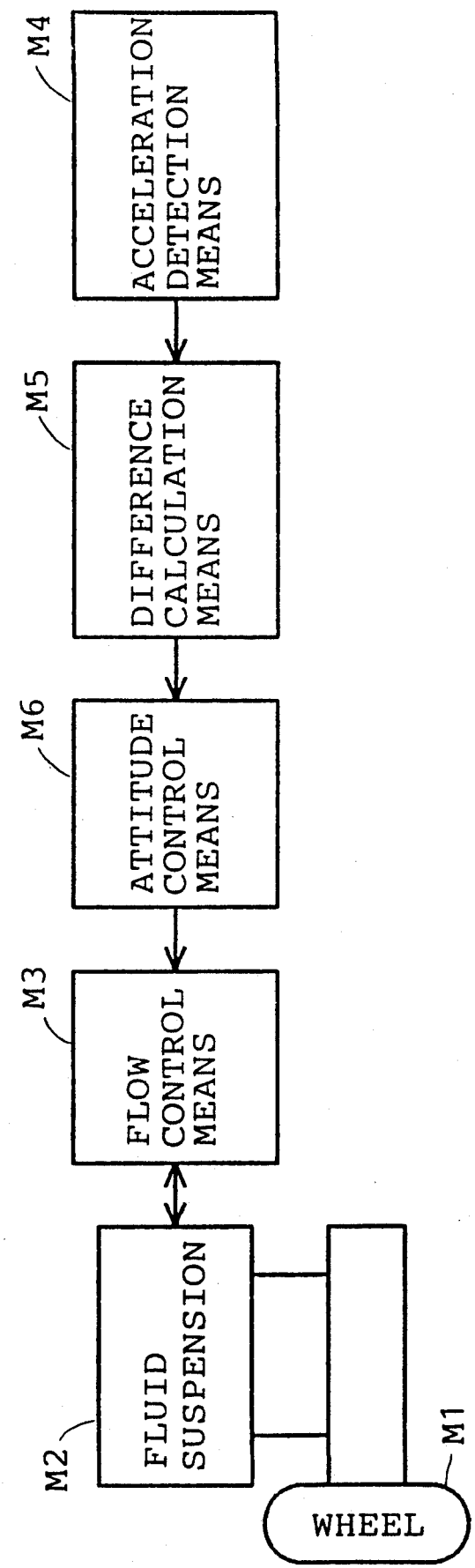
FIG. 1 is a block diagram indicating a fundamental structure of the present invention.
Figure 2:
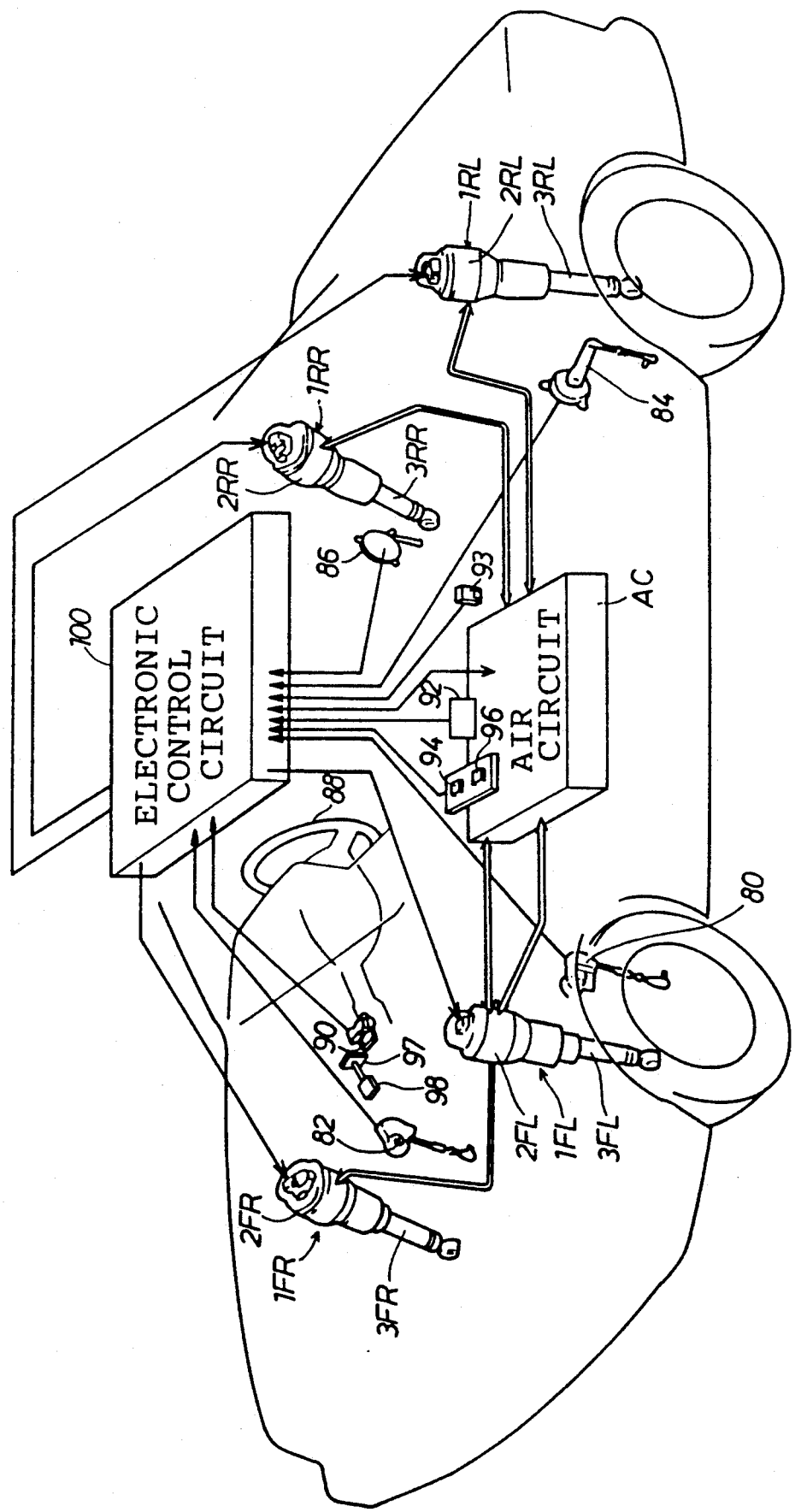
FIG. 2 is a schematic view of an electronic controlled air suspension system according to an embodiment of the present invention.
Figure 3:
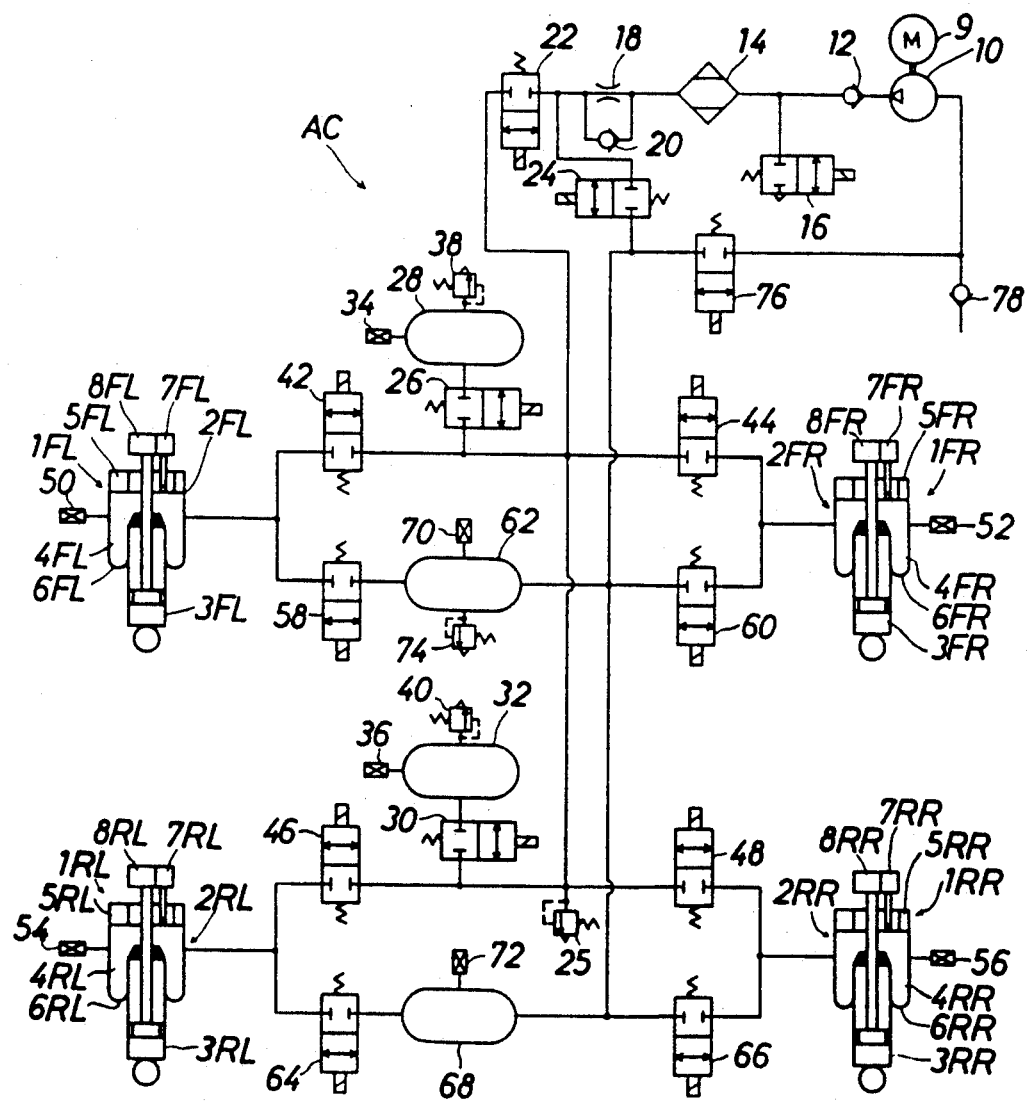
FIG. 3 is an air circuit diagram of the embodiment.

As shown in FIGS. 2 and 3, the electronic controlled air suspension system of the present embodiment is equipped with a front-wheel left suspension 1FL, a front-wheel right suspension 1FR, a rear-wheel left suspension 1RL and a rear-wheel right suspension 1RR, all of which are connected to an air circuit AC. These suspensions 1FL, 1FR, 1RL and 1RF are equipped with air springs 2FL, 2FR, 2RL and 2RR and shock absorbers 3FL, 3FR, 3RL and 3RR, respectively. The air springs 2FL, 2FR, 2RL and 2RR are equipped with main air chambers 4FL, 4FR, 4RL and 4RR and auxiliary air chambers 5FL, 5FR, 5RL and 5RR, respectively. The main air chambers 4FL, 4FR, 4RL and 4RR are partially formed of diaphragms 6FL, 6FR, 6RL and 6RR so that the height of the vehicle can be changed by supplying and discharging air to and from the main air chambers 4FL, 4FR, 4RL and 4RR. The air springs 2FL, 2FR, 2RL and 2RR can have their spring constants changed to "low", "medium" and "high" states by energizing spring motors 7FL, 7FR, 7RL and 7RR to either provide/block communications between the main air chambers 4FL, 4FR, 4RL and 4RR and the auxiliary air chambers 5FL, 5FR, 5RL and 5RR or to switch the air flow rates. The shock absorbers 3FL, 3FR, 3RL and 3RR can have their damping force changed to "low", "medium" and "high" by energizing absorber motors 8FL, 8FR, 8RL and 8RR to control the flow rate of working fluid passing through orifices (not shown).

The air circuit AC is equipped with a compressor 10 which is driven by a motor 9 so that it may act as a compressed air supply source for the air springs 2FL, 2FR, 2RL and 2RR. The compressor 10 has its discharge side connected to an air drier 14 and a discharge valve 16 through a check valve 12 for preventing any back flow. Silica gel is provided in the air drier 14 to remove moisture from the compressed air. This air drier 14 is connected to the respective one side of a supply valve 22 and a change-over valve 24 through a fixed throttle 18 and a check valve 20 for preventing any back flow. The other side of the supply valve 22 is connected to a relief valve 25 set at a predetermined pressure, and through a high pressure reservoir valve 26 to a front high pressure reserve tank 28, and through another high pressure reservoir valve 30 to a rear high pressure reserve tank 32. These high pressure reservoir valves are optionally communicable and discommunicable. The high pressure reserve tanks 28 and 32 are respectively equipped with pressure sensors 34 and 36 for detecting the air pressures in the high pressure reserve tanks 28 and 32 and relief valves 38 and 40 set at a predetermined pressure.

The above-mentioned side of the supply valve 32 is further connected through a leveling valve 42 to the main air chamber 4FL, through a leveling valve 44 to the main air chamber 4FR, through a leveling valve 46 to the main air chamber 4RL, and through a leveling valve 48 to the main air chamber 4RR. To these main air chambers 4FL, 4FR, 4RL and 4RR, respectively, there are connected pressure sensors 50, 52, 54 and 56 for detecting the air pressures.

The main air chamber 4FL at the front left side and the main air chamber 4FR at the front right side are connected to a front low pressure reserve tank 62, respectively, through a discharge valve 58 and a similar discharge valve 60. Moreover, the main air chamber 4RL at the rear left side and the main air chamber 4RR at the rear right side are connected to a rear low pressure reserve tank 68, respectively, through a discharge valve 64 and a similar discharge valve 66. On the other hand, the front low pressure reserve tank 62 and the rear low pressure reserve tank 68 are connected to have communication at all times. To these low pressure reserve tanks 62 and 68, respectively, there are connected pressure sensors 70 and 72 for detecting the air pressures in the reserve tanks 62 and 68. To the front low pressure reserve tank 62, there is connected a relief valve 74 which is set at a predetermined pressure.

These two low pressure reserve tanks 62 and 68 are connected to the other side of the aforementioned change-over valve 24 and further to the suction side of the compressor 10 through a suction valve 76. To the suction side of the compressor 10, there are connected a check valve 78 for intaking external air.

The present embodiment is otherwise practicable without the check valve 78 by making a closed air circuit which is filed with air or other gas, e.g., nitrogen gas.

The aforementioned discharge vale 16, supply valve 22, change-over valve 24, high pressure reservoir valves 26 and 30, leveling valves 42, 44, 46 and 48, discharge valves 58, 60, 64 and 66, and suction valve 76 are of the normally closed two-position type in the present embodiment.

The present air circuit AC is equipped at its front side and rear side with two high pressure reserve tanks 28 and 32 and two low pressure reserve tanks 62 and 68. It is also possible to provide a common high pressure reserve tank and a common low pressure reserve tank.

As shown in FIG. 2, in the suspension system of the present embodiment, there are provided: a height sensor 80 as the vehicle height detection means for detecting the distance between the left front wheel and the vehicle body, i.e., the left front height; a height sensor 82 for detecting the right front height; a height sensor 84 for detecting the left rear height; and a height sensor 86 for detecting the right rear height. These vehicle height sensors 80, 82, 84 nd 86 output signals corresponding to a difference between a detected vehicle height and a predetermined standard vehicle height. When the detected vehicle height is larger than the standard height, a positive signal corresponding to the difference is output. For a height equal to the standard height, a zero signal is output. For a height smaller than the standard height, a negative signal corresponding to the difference is output.

There are also provided: a known steering angle sensor 90 for detecting a steering angle of a steering wheel 88; an acceleration sensor 92 as the acceleration detection means for detecting the longitudinal and lateral accelerations of the vehicle body; and a speed sensor 93 for detecting a vehicle speed based on a revolution speed of the output shaft of a transmission (not shown). Further provided are high and low level switches 94 and 96 which are manually operated to instruct the vehicle height; and a brake switch 98 for detecting that a brake pedal 97 is operated. The air circuit AC acts as the flow control means.

Figure 4:
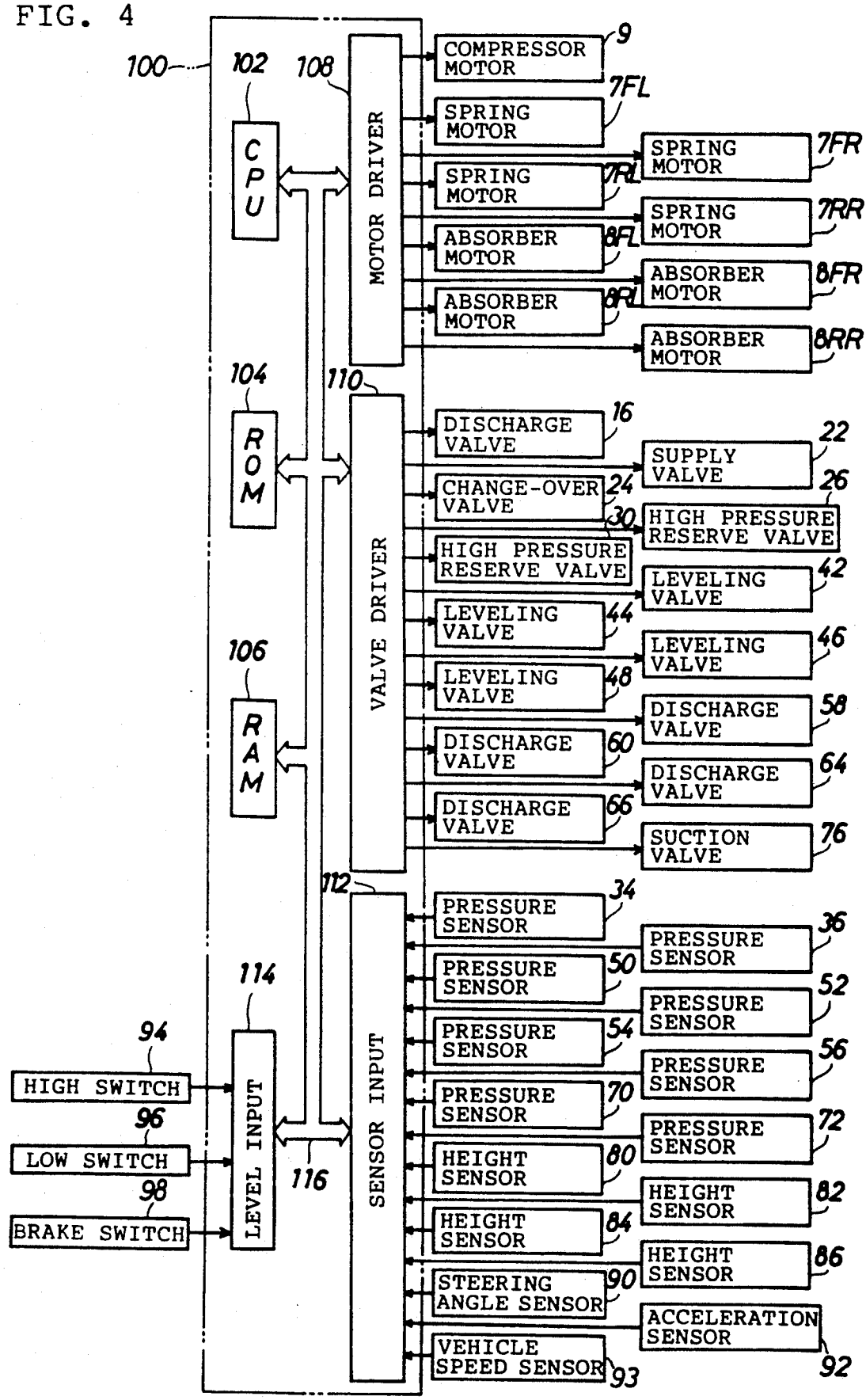
FIG. 4 is a block diagram indicating the constitution of an electric system according to the embodiment.

The electrical system of the present embodiment will be described with reference to the block diagram shown in FIG. 4. The aforementioned individual air suspensions 1FL, 1FR, 1RL and 1RR are driven and controlled by an electronic control circuit 100 to control the attitude of the vehicle. This electronic control circuit 100 is constructed as a logical arithmetic circuit and includes, as shown in FIG. 4, known CPU 102, ROM 104 and RAM 106. The CPU 102, ROM 104 and RAM 106 are mutually connected with input/output circuits, such as a motor driver 108, a valve driver 110, a sensor input circuit 112 and a level input circuit 114 by way of a common bus 116.

The CPU 102 receives the signals of the pressure sensors 34, 36, 50, 52, 54, 56, 70 and 72, the height sensors 80, 82, 84 and 86, the steering angle sensor 90, the acceleration sensor 92 and the speed sensor 93 by way of the sensor input circuit 112, and the signals of the high and low level switches 94 and 96 and the brake switch 98 by way of the level input circuit 114. In response to these signals and the data in the ROM 104 and the RAM 106, the CPU 102 controls the individual air suspensions 1FL, 1FR, 1RL and 1RR by outputting drive signals to the compressor motor 9, the spring motors 7FL, 7FR, 7RL and 7RR and the absorber motors 8FL, 8FR, 8RL and 8RR through the motor driver 108 and by outputting drive signals to the discharge valve 16, the supply valve 22, the change-over valve 24, the high pressure reservoir valves 26 and 30, the leveling valves 42, 44, 46 and 48, the discharge valves 58, 60, 64 and 66 and the suction valve 76 through the valve driver 110.

Figure 10:
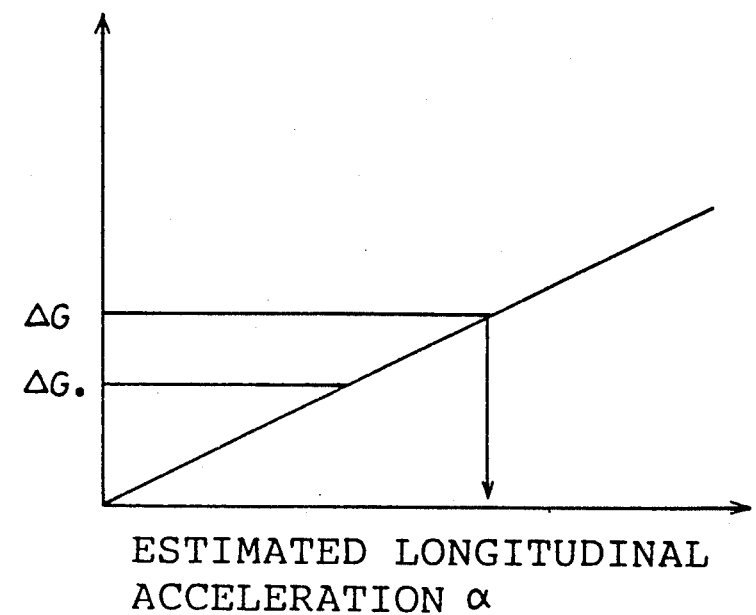
FIG. 10 is a graph showing a relation between an acceleration difference and an estimated longitudinal acceleration.
Figure 11:
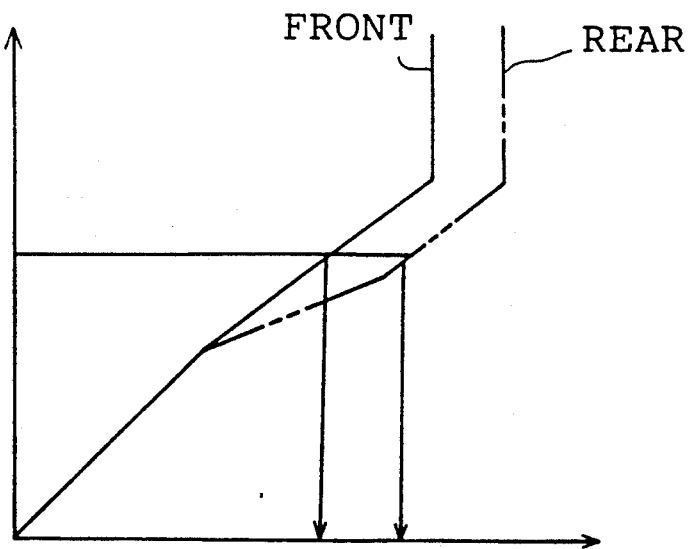
FIG. 11 is a graph indicating a relation between an estimated longitudinal acceleration and a vehicle height correction amount.

The ROM 104 stores a map MAP-a corresponding to a graph shown in FIG. 10 and a map MAP-b corresponding to a graph shown in FIG. 11. In FIG. 10, the ordinate represents a later-described acceleration difference $\Delta G$ and the abscissa represents a later-described estimated longitudinal acceleration $\alpha$. In FIG. 11, the ordinate plots an estimated longitudinal acceleration $\alpha$ and the abscissa plots the absolute value of a vehicle height correction control amount C as the control parameter.

Figure 12:
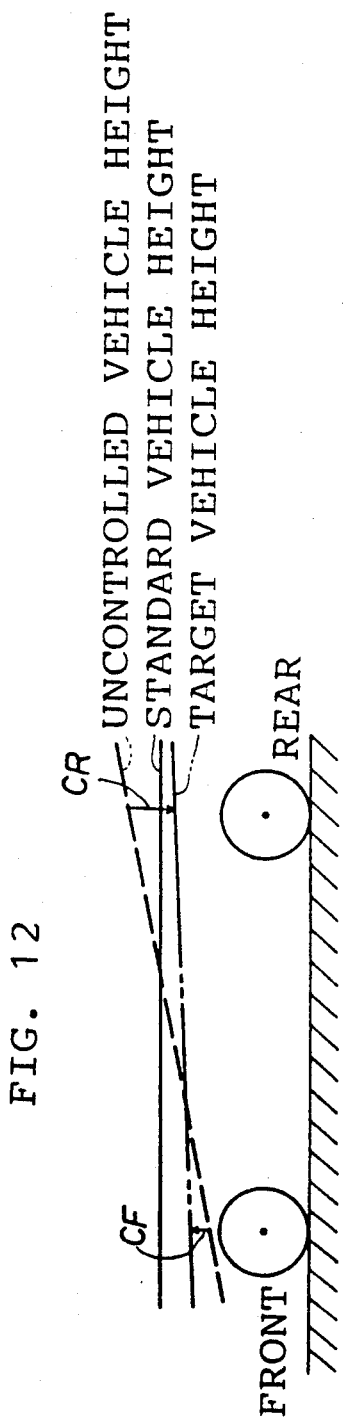
FIG. 12 illustrates a variation of vehicle attitude in comparison with a standard vehicle height.
Figure 13:
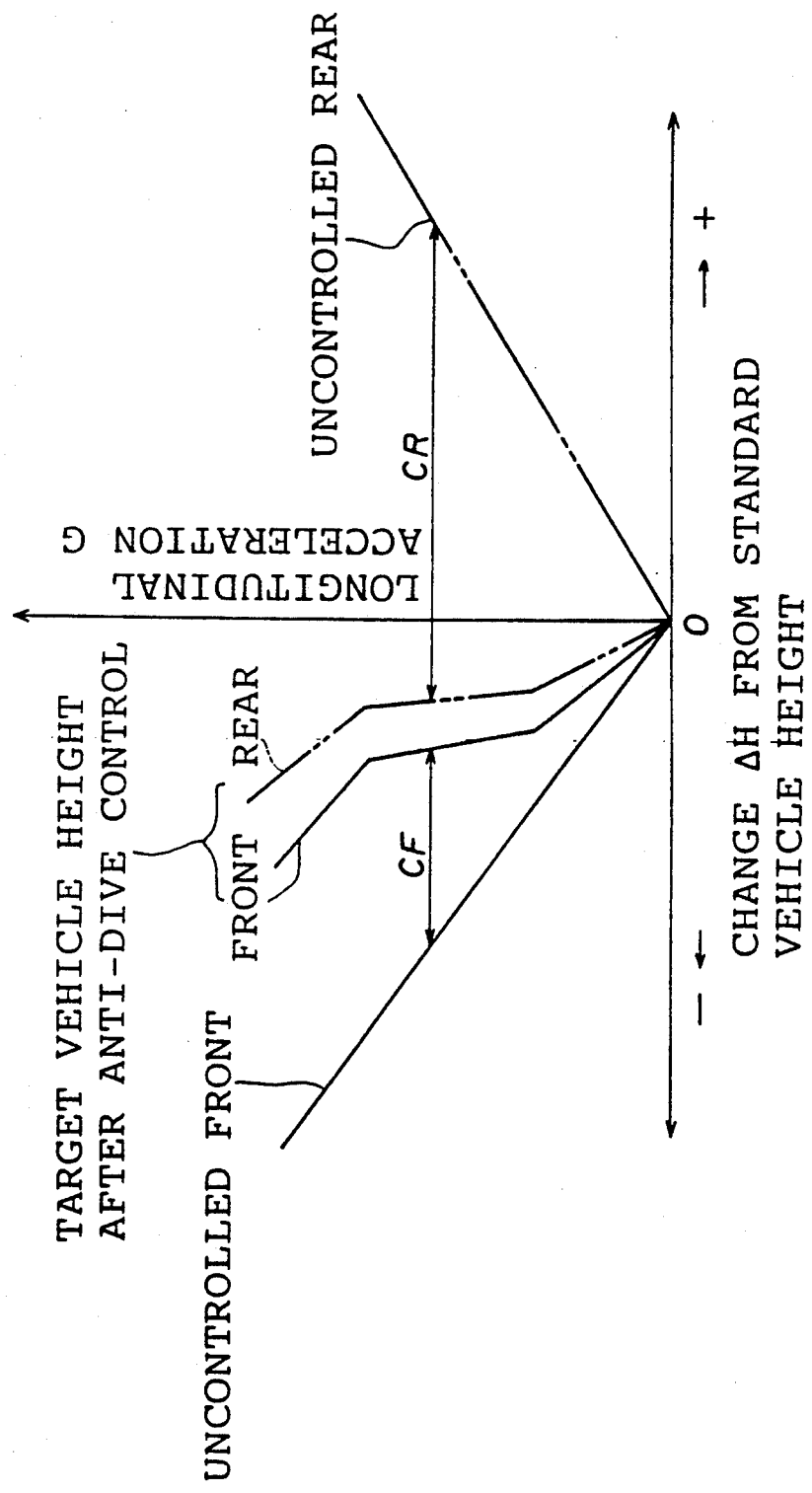
FIG. 13 is a graph showing a relation between a longitudinal acceleration and a change from the standard vehicle height.

The graph of FIG. 11 will be understood with reference to FIGS. 12 and 13. As shown in FIG. 12, when an anti-dive control is executed, a target vehicle height (two-dash chain line) is determined so that both the front and a rear heights become lower than a standard vehicle height (solid line) and also that the front height becomes lower than the rear height. The control amount is determined by a front difference CF and a rear difference CR between the target vehicle height (two-dash chain line) and a height of a vehicle which is not undergoing the anti-dive control (broken line). In order to calculate these control amounts CF and CR in response to a longitudinal acceleration G, a graph shown in FIG. 13 is provided. In FIG. 13, the ordinate represents the longitudinal acceleration G of the vehicle body and the abscissa represents a change amount $\Delta H$ from the standard vehicle height. This graph shows changes in front and a rear vehicle heights when the anti-dive control is not carried out and those after undergoing the anti-dive control corresponding to the longitudinal acceleration G, i.e., a target vehicle height. With reference to this graph, the control amount corresponding to the longitudinal acceleration G, i.e., the front difference CF and the rear difference CR between the target vehicle height and the uncontrolled vehicle height are obtained. The graph of FIG. 11 is determined based on these differences CF and CR.

The ROM 104 further stores maps MAP-c, MAP-d, MAP-e, MAP-f and MAP-g respectively corresponding to the graphs of FIGS. 14, 15, 16, 17 and 18.

Figure 14:
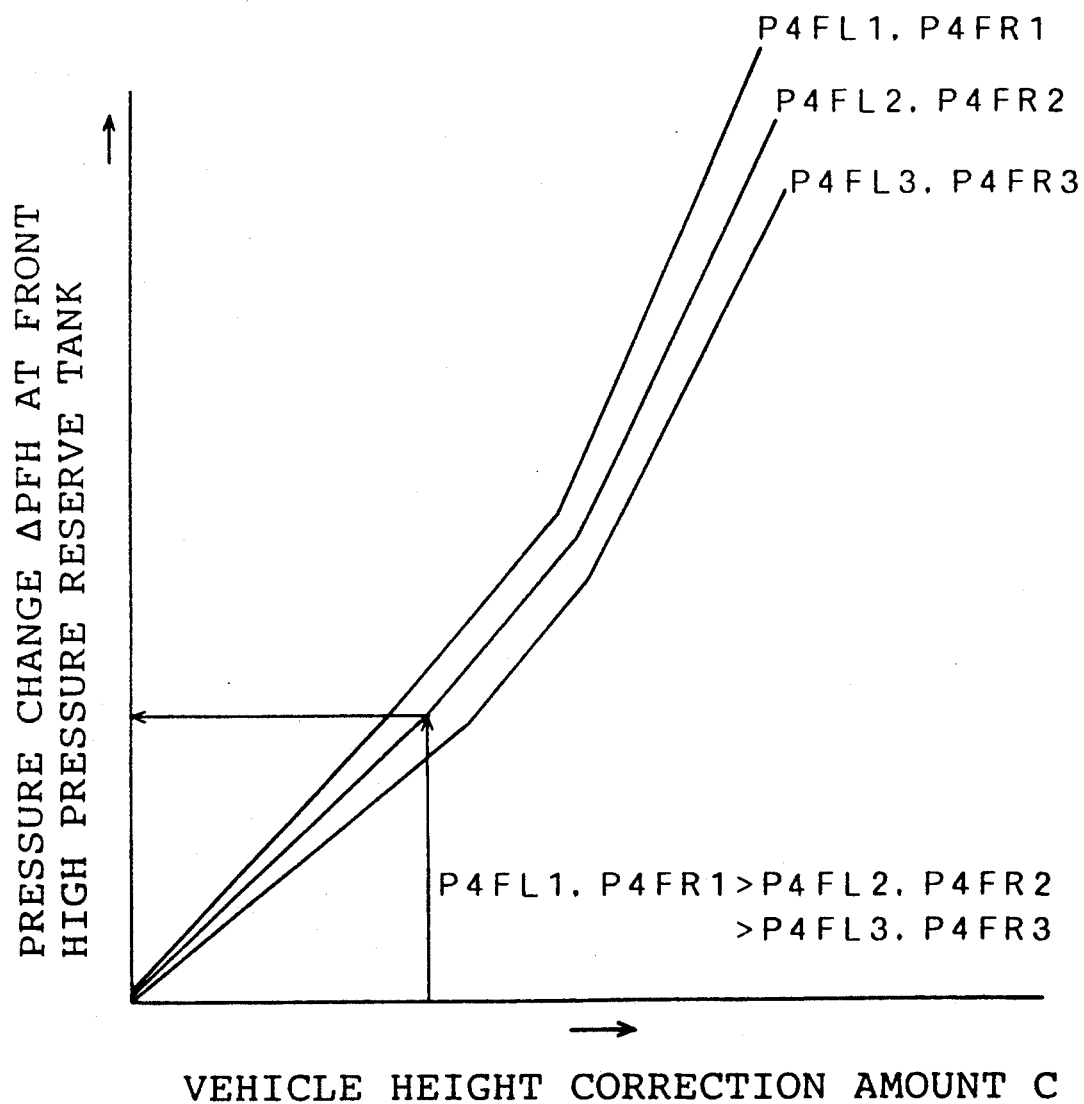
FIG. 14 is a graph indicating a relation between a pressure change at front high pressure reserve tank and a vehicle height correction amount.

In FIG. 14 (MAP-c), the ordinate plots a pressure change $\Delta PFH$ at the front high pressure reserve tank 28 during discharging air from the reserve tank 28 and the abscissa plots a correction amount C of the front vehicle height. In this map, the pressures P4FL ad P4FR (P4FL1, P4FL2, P4FL3, P4FR1, P4FR2 and P4FR3) of the front main air chambers 4FL and 4FR, which may change according to a load weight of the vehicle, are provided as parameters.

Figure 15:
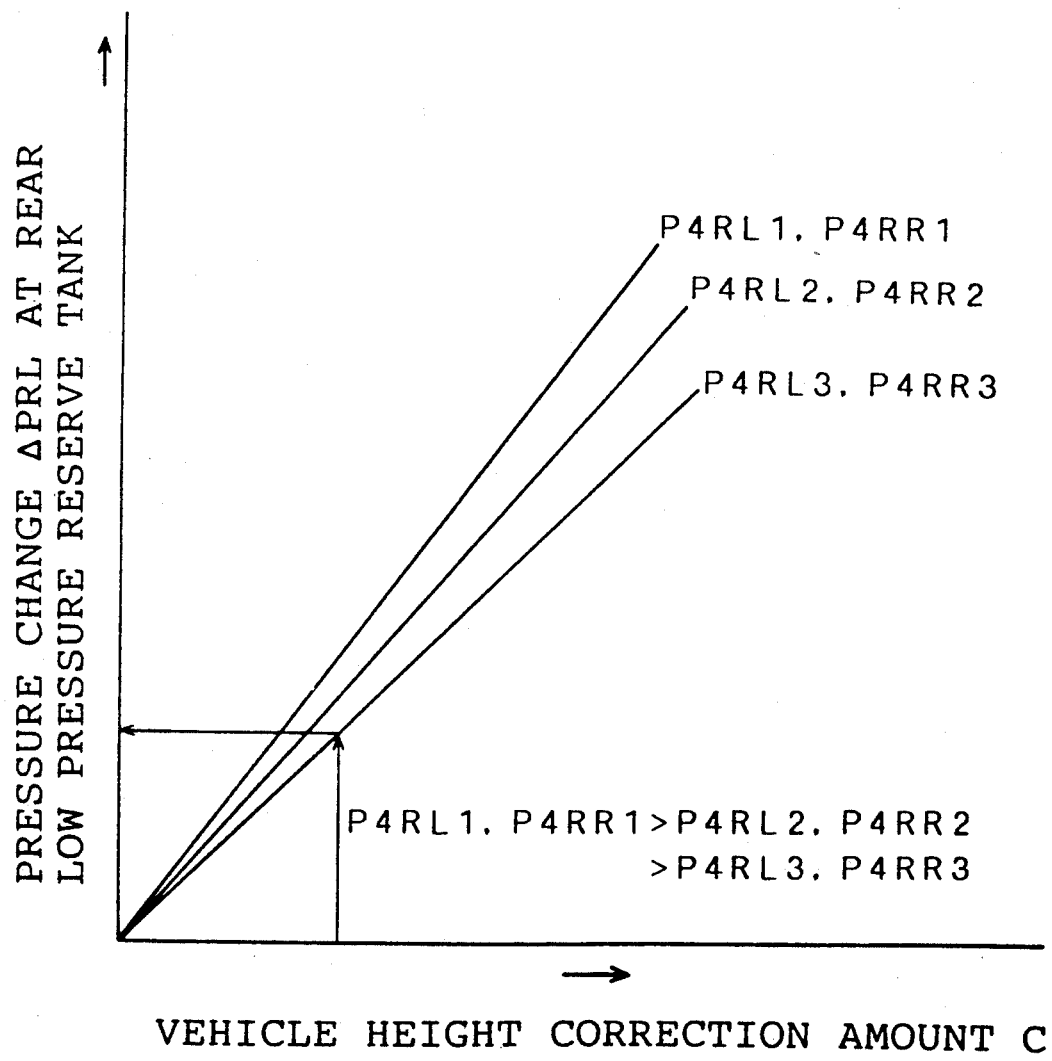
FIG. 15 is a graph illustrating a relation between a pressure change at rear low pressure reserve tank and a vehicle height correction amount.

In FIG. 15 (MAP-d), the ordinate plots pressure change $\Delta PRL$ at the rear low pressure reserve tank 68 during intaking air into the reserve tank 68 and the abscissa plots a correction amount C of the rear vehicle height. The pressures P4RL and P4RR (P4RL1, P4RL2, P4RL3, P4RR1, P4RR2 and P4RR3) in the rear main air chambers 4RL and 4RR, which may change according to the load weight of the vehicle, are utilized as parameters.

Figure 16:
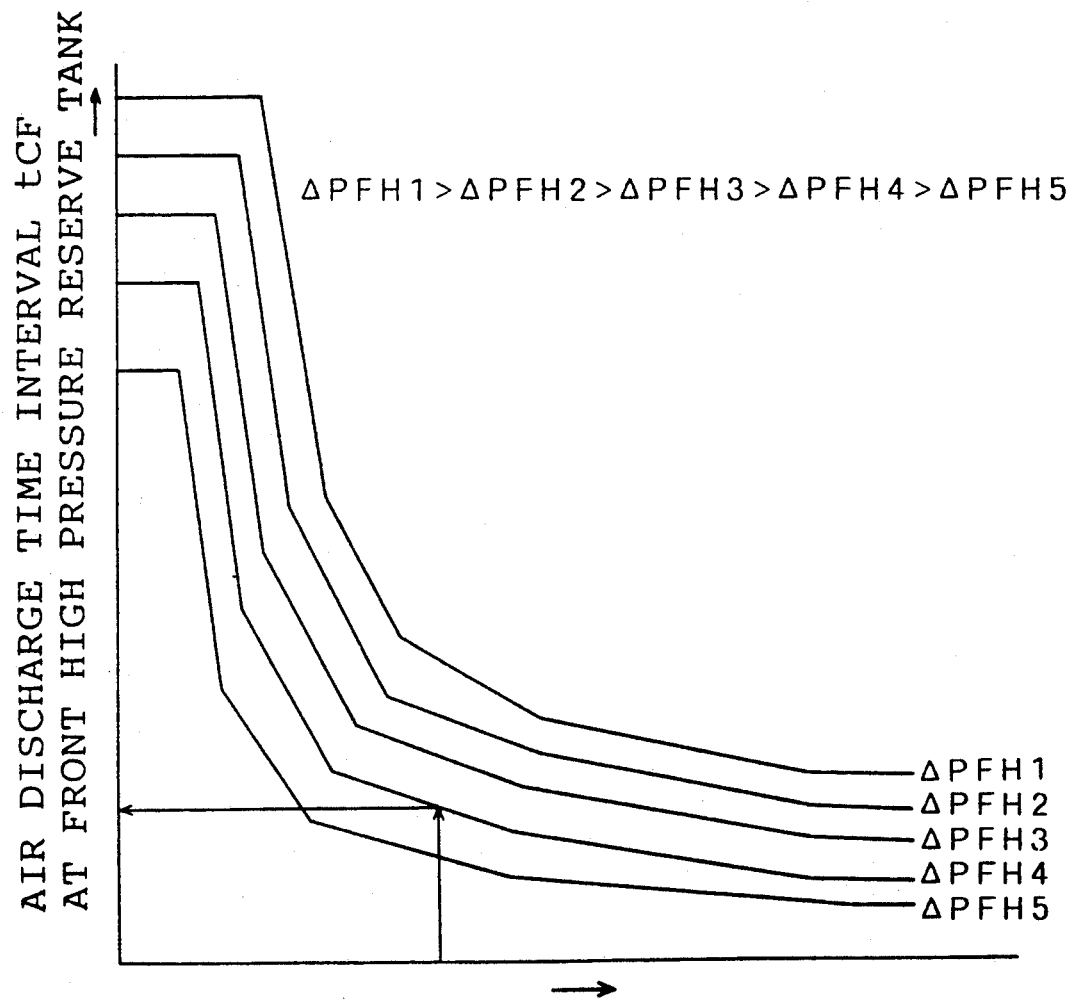
FIG. 16 is a graph showing a relation between an air discharge time interval at front high pressure reserve tank and a ratio of a front high pressure reserve tank pressure to main air chamber pressures.

In FIG. 16 (MAP-e), the ordinate represents an air discharge time interval tCF necessary to lower the front high pressure reserve tank pressure PFH by the pressure change $\Delta PFH$ ($\Delta PFH1$, $\Delta PFH2$, $\Delta PFH3$, $\Delta PFH4$ and $\Delta PFH5$) when the compressed air is supplied from the high pressure reserve tank to the front main air chambers 4FL and 4FR. The abscissa plots PFH/P4FL or P4FR), i.e., a ratio of the front high pressure reserve tank pressure PFH to the main air chamber pressure P4FL or P4FR.

Figure 17:
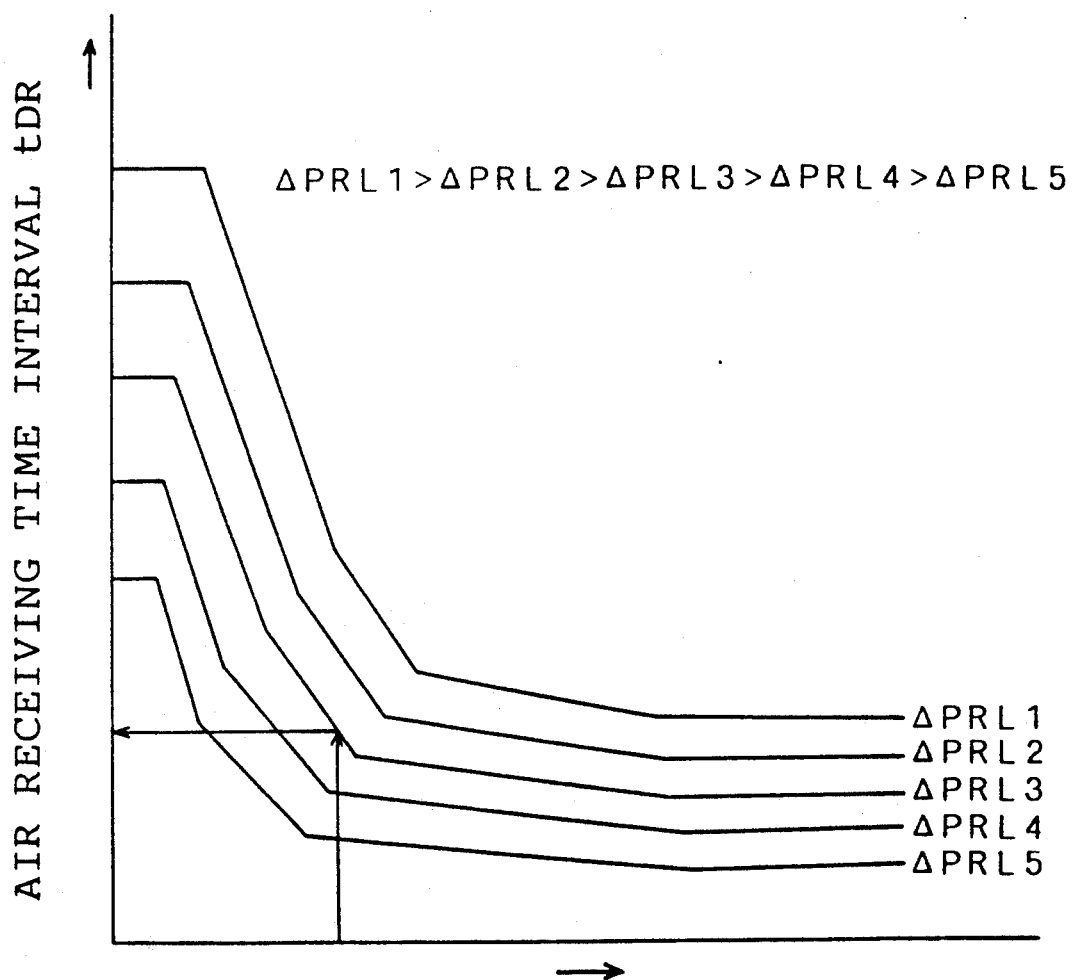
FIG. 17 is a graph indicating a relation between an air receiving time interval at rear low pressure reserve tank and a ratio of main air chamber pressures to a rear low pressure reserve tank pressure.

In FIG. 17 (MAP-f), the ordinate plots an air receiving time interval tDR which is required for increasing the low pressure reserve tank pressure PRL by the pressure change $\Delta PRL$ ($\Delta PRL1$, $\Delta PRL2$, $\Delta PRL3$, $\Delta PRL4$ and $\Delta PRL5$) when the air is discharged from the rear main air chambers 4RL and 4RR to the rear low pressure reserve tank 68. The abscissa plots (P4RL or P4RR)/PRL, i.e., a ratio of the main air chamber pressures P4RL and P4RR to the rear low pressure tank pressure PRL.

Figure 18:
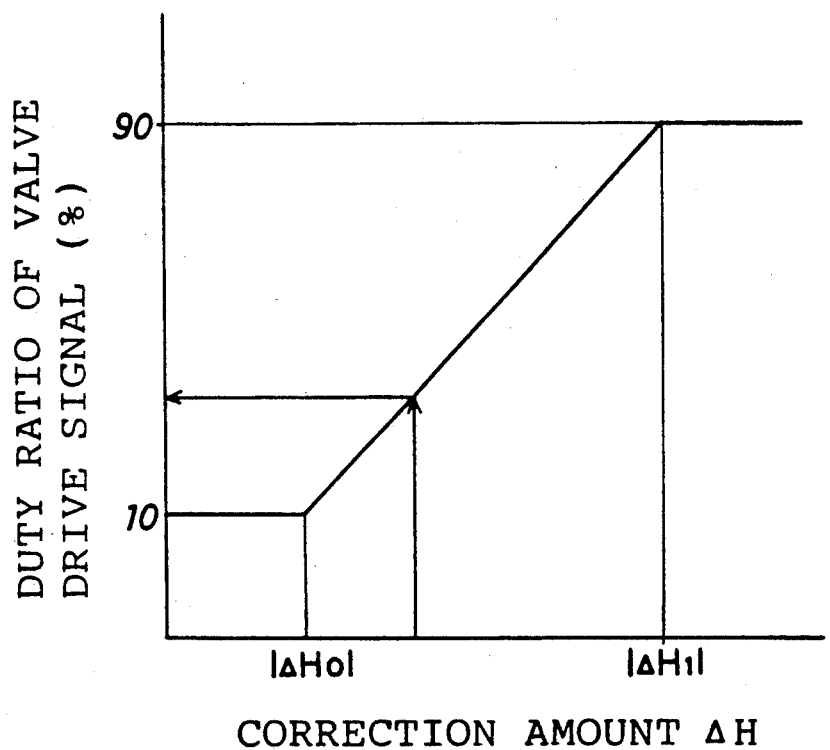
FIG. 18 is a graph showing a relation between a duty ratio of valve drive signal and a correction amount.

In FIG. 18 (MAP-g), the ordinate represents a duty ratio of a valve drive signal (later described) and the abscissa represents a correction amount $\Delta H$.

Furthermore, the ROM 104 stores a map MAP-h similar to the MAP-c of FIG. 14, indicating a relation between a pressure change ΔPRH at the rear high pressure reserve tank 32 and a correction amount C of the rear vehicle height; a map MAP-i similar to the MAP-d of FIG. 15, showing a relation between a pressure change ΔPFL at the front low pressure reserve tank 62 and a correction amount C of the front vehicle height; a map MAP-j similar to the MAP-e of FIG. 16, indicating a relation between an air discharge time interval tCR for lowering the pressure at the rear high pressure reserve tank 32 and a ratio of main air chamber pressures P4RL and P4RR to a rear high pressure reserve tank pressure PRH; and a map MAP-k similar to the MAP-f of FIG. 17, showing a relation between an air receiving time interval tDR for increasing the pressure at the front low pressure reserve tank 62 and a ratio of a front low pressure tank pressure PFL to main air chamber pressures P4FL and P4FR.

The process steps to be executed in the electronic control circuit 100 will be described with reference to the flowcharts of FIGS. 5 through 8.

In the electronic controlled suspension system of the present embodiment, the suspension control routine shown in FIGS. 5 through 8 is executed with other control routines when a key switch (not shown) is turned on. First of all, at step 200, various data and flags are initialized. At subsequent step 205, signals from the pressure sensors 34, 36, 50, 52, 54, 56, 70 and 72, the vehicle height sensors 80, 82, 84 and 86, the steering angle sensor 90, the acceleration sensor 92 and the vehicle speed sensor 93 are input through the sensor input circuit 112. Based on those signals, vehicle states are calculated at step 210. For example, an average longitudinal acceleration Gn is calculated in accordance with a formula (a):

$$Gn = \sum_{m=1}^{4} Gm/4, \quad (1)$$

in which the current longitudinal acceleration Gm detected by the acceleration sensor 92 is input every predetermined time interval (e.g., 8 msec) to get a sum of the longitudinal acceleration $$\sum_{m=1}^{4} Gm$$

every predetermined longer time interval ta (e.g., 32 msec).

In the same manner, an average lateral acceleration Gan is calculated based on a current lateral acceleration Gan detected by the acceleration sensor 92 at every predetermined time interval (e.g., 8 msec) and the sum of the lateral acceleration obtained every predetermined longer time interval (e.g., 32 msec). Moreover, an average vehicle height Hn is calculated based on the current vehicle height Hn detected by the vehicle height sensors 80, 82, 84 and 86 every predetermined time interval (e.g., 8 msec) and the sum of the vehicle height obtained very predetermined longer time interval (e.g., 32 msec).

At step 215, it is determined whether or not a later-described rapid control interruption flag is set. If the answer is NO, the program proceeds to step 220 at which it is determined whether or not a later-described anti-dive flag is set. If the answer is NO, the program further proceeds to step 225, at which it is determined whether a dive condition is set. The dive condition is defined as satisfying all of the following conditions: the current vehicle speed V calculated at step 210 is larger than a predetermined speed Va (e.g., 25 km/h); the absolute value of the current lateral acceleration Ga is smaller than a predetermined acceleration Gao (e.g., 0.3 g; g=gravitational acceleration); the brake pedal 97 is operated and the brake switch 98 is turned on; the absolute value of a steering angle θ of the steering wheel 88 detected by the steering angle sensor 90 is smaller than a predetermined angle θo (e.g., 45°); and the absolute value of a steering angular velocity θ is smaller than a predetermined angular velocity θo (e.g., 140°).

When it is determined at step 225 the dive condition is set, the program proceeds to step 230. At this step, an acceleration difference ΔG is calculated by subtracting a minimum average longitudinal acceleration GMIN from a maximum average longitudinal acceleration GMAX (ΔG=GMAX−GMIN). As shown in FIG. 9, GMAX and GMIN are respectively selected from three average longitudinal accelerations $\overline{G1}$, $\overline{G2}$ and $\overline{G3}$ which are detected at step 210 by the acceleration sensor 92 every predetermined time interval ta (e.g., 32 msec) within a predetermined time period tb (e.g., 96 msec) immediately after the dive condition is satisfied.

At subsequent step 235, it is determined whether or not the acceleration difference ΔG is larger than a predetermined acceleration ΔGo (e.g., 0.096 g). If the answer is YES, the anti-dive flag is set at step 240 so as to start a vehicle attitude control to be set forth. In response to the calculated acceleration difference ΔG, an estimated longitudinal acceleration α is obtained at step 245 based on the previously stored map MAP-a, i.e., the graph of FIG. 10. At step 250, the front vehicle height correction CF and the rear vehicle height correction CR as the control parameters are calculated based on the estimated longitudinal acceleration α in the previously stored map MAP-b, i.e., the graph of FIG. 11.

At step 255, the pressure changes ΔPFH and ΔPRL at the front high pressure reserve tank 28 and the rear low pressure reserve tank 68 for discharging/intaking air to/from the main air chambers 4FL, 4FR, 4RL and 4RR are determined based on the vehicle height correction amounts CF and CR. The pressure change ΔPFH at the front wheel-side high pressure reserve tank 28 corresponding to the vehicle height correction CF is calculated based on the pressures P4FL and P4FR at the front air springs and the front vehicle height correction amount CF shown in FIG. 14 (MAP-c). On the other hand, the presence change ΔPRL at the rear low pressure reserve tank 68 corresponding to the rear vehicle height correction amount CR is determined based on the pressures P4RL and P4RR in the rear main air chambers and the rear vehicle height correction amount CR shown in FIG. 15 (MAP-d).

At subsequent step 260, an energizing time interval T for energizing the individual valves for communicating the front high pressure reserve tank 28 or the rear low pressure reserve tank 68 and the main air chambers 4FL, 4FR, 4RL and 4RR is calculated based on the above-calculated pressure changes ΔPFH and ΔPRL. For the front side, a valve energization time interval TCF is calculated as follows. First, the air discharging time interval tCF at the front high pressure reserve tank 28 is calculated by using the pressure change ΔPFH and the ratio PFH/(P4FL or P4FR) in accordance with FIG. 16 (MAP-e). Based on the air discharging time interval tCF, a valve energizing time interval TCF is calculated according to a formula (2) taking a flow resistance coefficient and a valve coefficient into account.

$$TCF = A \cdot tCF + B \quad (2)$$

For the rear, an air receiving time interval tDR at the rear low pressure reserve tank 62 is calculated by using the pressure change ΔPRL and the ratio (P4RL or P4RR)/PRL in accordance with FIG. 17 (MAP-f). Then, a valve energization time interval TDR is calculated based on the air receiving time interval tDR according to the following formula (3) taking the flow resistance coefficient and the valve coefficient into account.

$$TDR = C \cdot tDR + D \quad (3)$$

Subsequent to the calculation of the valve energization time intervals TCF and TDR, a timer is set at step 265 for a predetermined time interval t1 (e.g., 60 msec) which is utilized for executing control processes to be described later. In response to TCF and TDR, a high pressure reservoir valve 26, leveling vales 42 and 44, and discharge valves 64 and 66 are energized at step 270. For example, the high-pressure reservoir valve 26 and the leveling valves 42 and 44 are controlled in response to the front valve energization time interval TCF, and the discharge valves 64 and 66 are controlled in response to the rear valve energization time interval TDR so that the timing for closing the individual valves 42, 44, 64 and 66 coincides.

Figure 8:
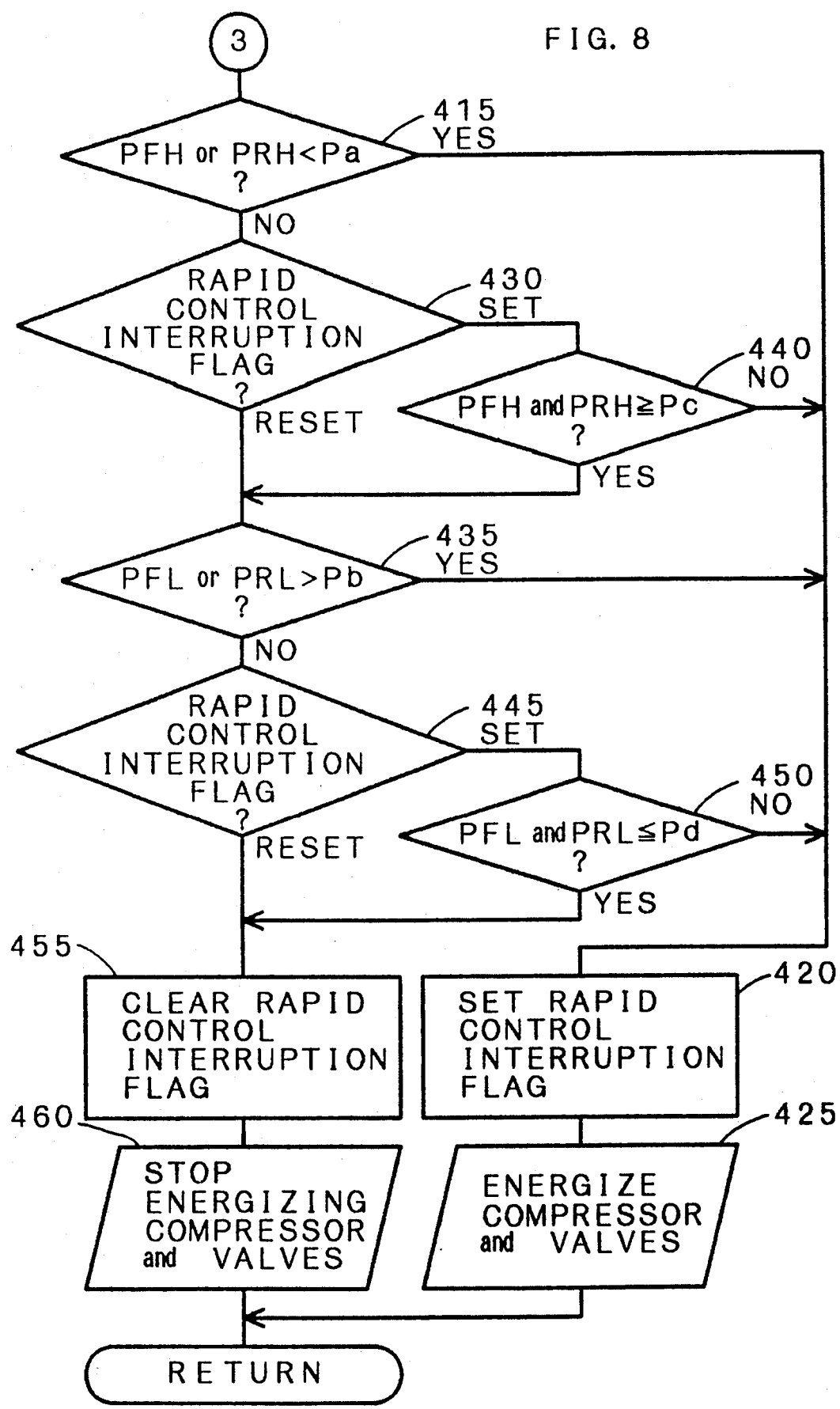
Figure 9A:
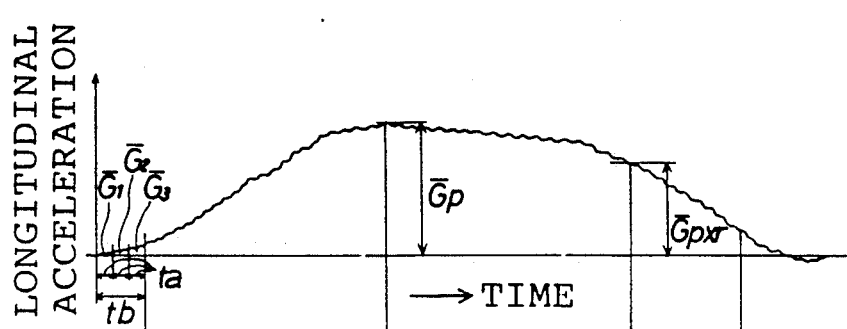
FIGS. 9A–9E are graphs indicating an interrelation among a longitudinal acceleration, a valve energizing signal, a damping force change signal and a vehicle height with reference to time.
Figure 9B:
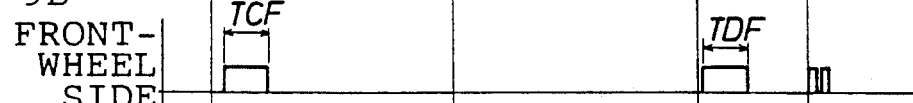
Figure 9C:
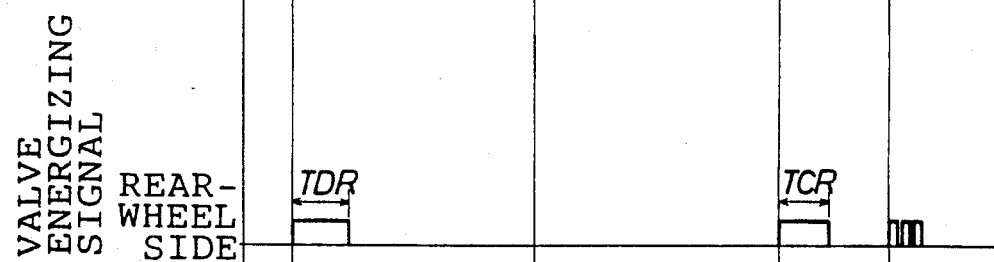
Figure 9D:
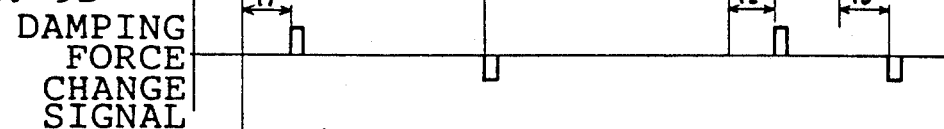
Figure 9E:
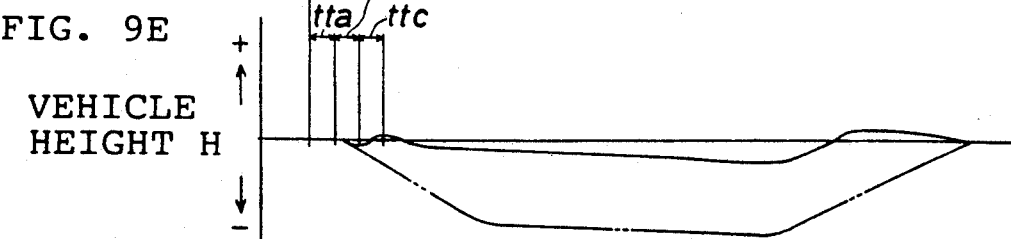

As a result of the above-mentioned controls, the front vehicle height H starts changing a little after the brake pedal 97 is operated and the longitudinal acceleration G is changed, as shown in FIGS. 9A and 9E. When the valve energization signal is output by executing the operation at step 270, the valve is actually energized after a certain delay time tta (e.g., 30 msec). Then the compressed air is rapidly supplied form the front high pressure reserve tank 28 to the front main air chambers 4FR and 4FL, and the air in the rear main air chambers 4RL and 4RR is rapidly discharged to the rear low pressure reserve tank 68. Such air discharge/intake controls exert an influence upon the vehicle height after a certain delay time ttb (e.g., 30 msec). In FIG. 9E, a two-dash chain line indicates the change in the vehicle height H when the air discharge/intake control is not carried out. In the present embodiment, the time period t1 determined at step 265 is set equal to the sum of the delay times tta and ttb (t1 = tta + ttb). Thus, the vehicle attitude is controlled to approach the target vehicle height as shown in FIG. 12. Namely, the vehicle height is controlled to be lower than the standard vehicle height and also the front height is set to be lower than the rear height in order to prevent aiming. Step 270 is followed by the process steps shown in FIG. 8. The present control routine is repeatedly executed after later-described processes of FIG. 8 are executed.

Figure 5:
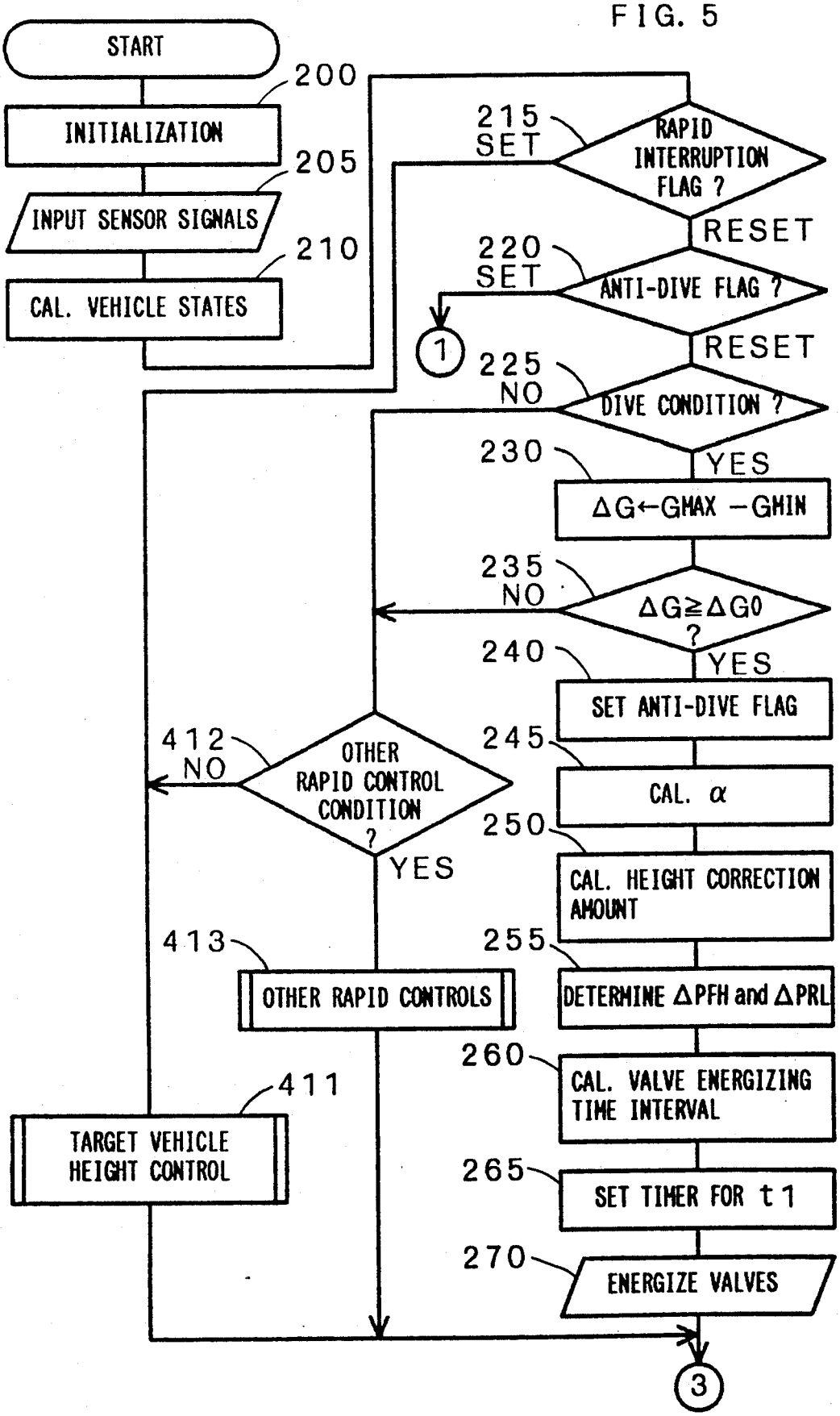
FIGS. 5, 6, 7 and 8 are flowcharts showing a control routine to be executed in a control circuit of the embodiment.
Figure 6:
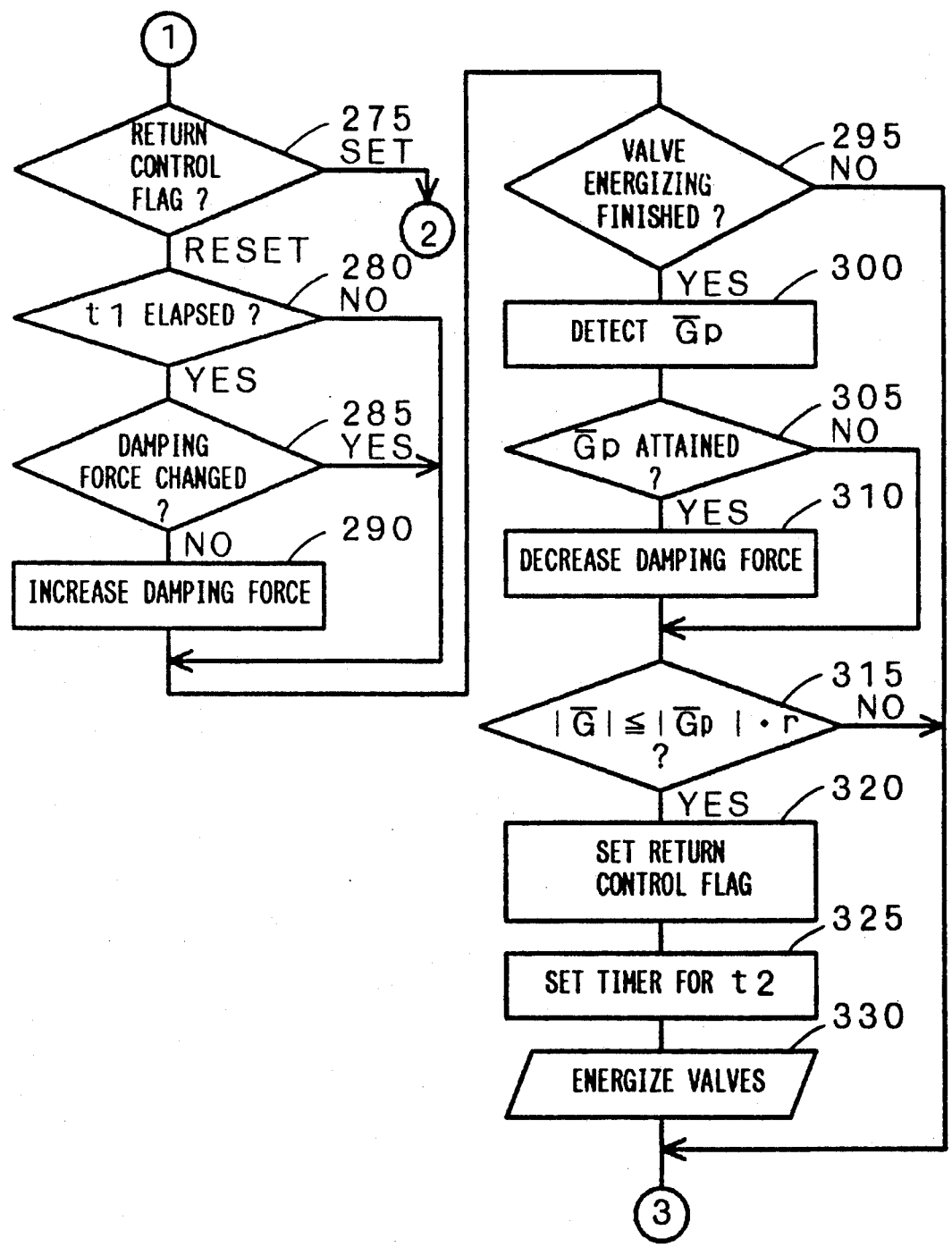

Reference is now made to step 220 in FIG. 5. If it is determined at step 220 that the anti-dive flag is set, the program proceeds to step 275 in FIG. 6. At this step, it is determined whether or not a later-described return control flag is set. If the answer is YES, it is determined at step 280 whether or not the predetermined time interval t1 set at the aforementioned step 265 has elapsed. If the time interval t1 has elapsed at step 280 and the damping forces of the shock absorbers 3FL, 3FR, 3RL and 3RR have not been changed yet at step 285, the damping force is changed to be a higher level at step 290 so as to prevent tossing of the vehicle body due to the rapid discharging/intaking of the compressed air. For example, when the current damping force is in "low" stage, it is changed to "medium" by energizing the absorber motors 8FL, 8FR, 8RL and 8RR. If in "medium" stage, the damping force is changed to "high".

If, on the other hand, it is determined that the preset time interval t1 has not elapsed at step 280, or that the damping force has been already changed at step 285 or that the damping force is increased at step 290, the present control routine is repeatedly executed until it is determined at step 295 that the energization of the valves corresponding to the valve energization time intervals TCF and TDR (step 270) is accomplished. When the valve energization is accomplished at step 295, a maximum acceleration $\overline{G}p$ of the average longitudinal acceleration G is determined at step 300. If it is determined at step 305 that the maximum acceleration $\overline{G}p$ has been attained, the program proceeds to step 310. At step 310, the damping forces of the shock absorbers 3FL, 3FR, 3RL and 3RR, which have been increased at step 290, are then lowered to restore the original level.

On the other hand, when the braking operation by the brake pedal 97 is released and the longitudinal acceleration G is decreased, it is determined at step 315 whether the current average longitudinal acceleration G is equal to or lower than a predetermined ratio γ (e.g., 70%) of the maximum acceleration $\overline{G}p$. If the answer is YES, the return control flag is set at step 320 in order to start the return control. Subsequently, at step 325, a timer is set for a predetermined time interval t2 (e.g., 60 msec) utilized in executing the return control. At step 330, the individual valves are energized in order to return the vehicle attitude, which was controlled by the aforementioned attitude control to be lower than the standard vehicle height and to have a front-low attitude, to the standard vehicle height. Namely, the vehicle attitude is controlled by implementing the control procedures opposite to those executed at steps 255, 260 and 270 in response to the front and rear vehicle height correction amounts CF and CR calculated at step 250. First of all, the pressure change ΔPFL at the front low pressure reserve tank 62 corresponding to the vehicle height correction CF is calculated by using the pressures P4FL and P4FR in the front air springs and the front vehicle height correction CF according to MAP-i. The pressure change ΔPRH at the rear high pressure reserve tank 32 is also calculated by utilizing the rear vehicle height correction CF in accordance with the MAP-h.

Based on the above-calculated pressure changes ΔPFL and ΔPRH, the front valve energizing time interval TDF and the rear valve energization time interval TCR are calculated in a similar manner at step 260 with reference to the MAP-j and the MAP-k and regarding the flow resistance. At step 330, the discharge valves 58 and 60 are energized in response to the front valve energization time interval TDR and the high pressure reservoir valve 30 and the leveling valves 46 and 48 are energized in response to the rear valve energization time interval TCR so that the timing for closing the individual valves 30, 46, 48, 58 and 60 coincides.

Figure 7:
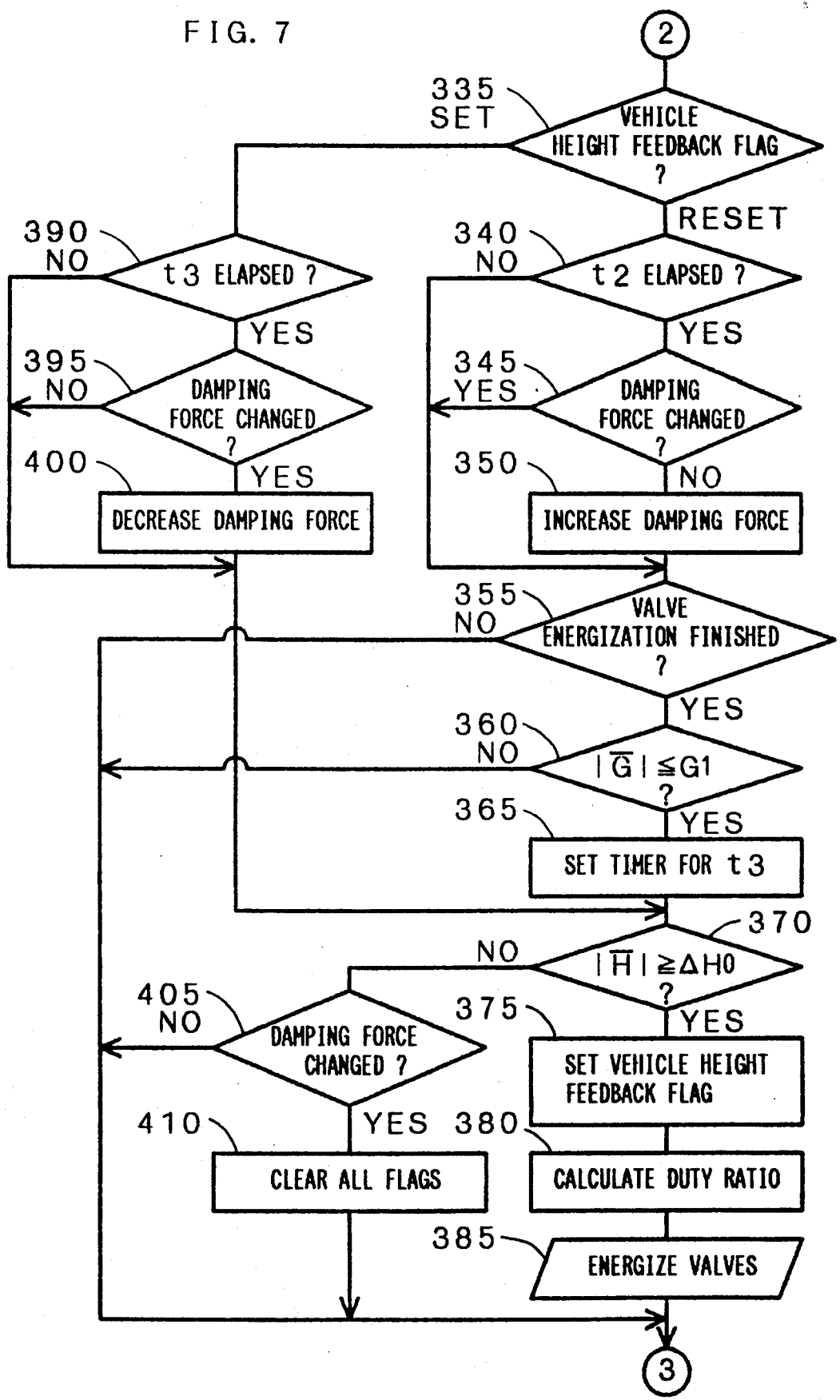

When the present control routine is repeatedly executed by energizing the individual valves and if the anti-dive flag and the return control flag are set at steps 220 and 275, the program proceeds to step 335 in FIG. 7. At step 335, it is determined whether a later-described feed-back flag is set. If the answer is NO, it is determined at step 340 whether the time interval t2 set at step 325 has elapsed. If the time interval t2 has elapsed at step 340 and the damping force of the shock absorbers 3FL, 3FR, 3RL and 3RR has not been changed yet at step 345, the damping force is changed to a higher level at step 350. For example, when the current damping force is in "low" stage, it is changed to "medium" by energizing the absorber motors 8FL, 8FR, 8RL and 8RR. If in "medium" stage, the damping force is changed to "high".

On the other hand, if it is determined that the preset time interval t2 has not elapsed at step 340, or that the damping force has been already changed at step 345 or that the damping force is increased at step 350, the present control routine is repeatedly executed until it is determined at step 355 that the energization of the valves corresponding to the valve energization time intervals TDF and TCR at step 330 is accomplished. When the energization of the valves is accomplished at step 355 and the absolute value of the average longitudinal acceleration $\overline{G}$ becomes lower than a predetermined acceleration G1 (e.g., 0.15 g) at step 360, a timer is set at step 365 for a predetermined time period t3 (e.g., 300 msec) which is utilized in executing an attitude correction control. Then, the attitude correction control is started. If it is determined at step 370 that the absolute value of the average vehicle height $\overline{H}$ is equal to or larger than a predetermined small value ΔHo, a vehicle height feedback flag is set at step 375 to feedback-control the vehicle height to the standard height. At subsequent step 380, a duty ratio D of valve energizing signal is calculated. If the average vehicle height $\overline{H}$ at a certain wheel is negative, the duty ratio D corresponding to the average vehicle height $\overline{H}$ (=ΔH) is calculated according to FIG. 18 in order to supply the compressed air from the high pressure reserve tanks 28 and 32 to the main air chambers 4FL, 4FR, 4RL and 4RR corresponding to the wheel by energizing the high pressure reservoir valves 26 and 30 and the leveling valves 42, 44, 46 and 48. On the other hand, if the average vehicle height $\overline{H}$ at the wheel is positive, the duty ratio of the valve drive signal corresponding to the average vehicle height $\overline{H}$ (=ΔH) is calculated at step 380 based on FIG. 18 in order to discharge the air in the main air chambers 4FL, 4FR, 4RL and 4RR corresponding to the wheel to the low pressure reserve tanks 62 and 68 by energizing the discharge valves 58, 60, 64 and 66. When the duty ratio D is calculated, the individual valves are energized at step 385 in response to the duty ratio D.

If the present control routine is repeatedly executed after energization of the valves, and if it is finally determined at step 335 the vehicle height feedback flag is set, the program proceeds to step 390. When it is determined at step 390 that a time period t3 set at step 365 has elapsed, and that the damping force of the shock absorbers 3FL, 3FR, 3RL and 3RR has not changed at step 395, the damping force which was increased at step 350 is returned to the original state at step 400. The program then proceeds to step 370. If the absolute value of the average vehicle height H is determined to be smaller than the preset value ΔHo at step 370 and also the damping force has already been changed at step 405, all of the aforementioend flags are cleared at step 410. Thus, the attitude correction control is completed.

Set forth is the explanation of the target vehicle height control. In FIG. 5, if it is determined at step 215 that a later-described rapid control flag is set, the program proceeds to step 411 and the target vehicle height control is executed. In this control, when the absolute value of the difference between the individual vehicle height H of the wheels detected by the vehicle height sensors 80, 82, 84 and 86 and the target vehicle height Hn for a straightforward running vehicle is larger than a predetermined value ΔH (e.g., a minimum value at which the vehicle height is controllable), the individual vehicle height H of the wheels is respectively controlled to approach the target vehicle height Hn by energizing the compressor 10 and the valves. For example, if the vehicle height H is lower than the target vehicle height Hn, the compressed air is supplied to one of the main air chambers 4FL, 4FR and 4RL and 4RR corresponding to the detected low vehicle height H by energizing the compressor 10, the supply valve 22 and one of the leveling valves 42, 44, 46 and 48 corresponding to the low vehicle height H. In this case, the volume of the air to be supplied to the main air chamber is determined corresponding to the capacity of the compressor 10 and the line flow resistance. Thus, the vehicle height H gradually approaches the target vehicle height Hn. When the vehicle height H attains the target vehicle height Hn, the energization of the compressor 10 and the valves 22, 42, 44, 46 and 48 are stopped.

On the other hand, if the vehicle height H is higher than the target vehicle height Hn, the air in one of the main air chambers 4FL, 4FR, 4RL and 4RR corresponding to the detected high vehicle height H is discharged externally by energizing the discharge valve 16, the communication valve 24 and one of the discharge valves 58, 60, 64 and 66 corresponding to the high vehicle height H without driving the compressor 10. In this case, the volume of the discharging air is determined by the opening of the throttle 18 and the line flow resistance. Thus, the vehicle height H gradually approaches the target vehicle height Hn. When Hn is attained, the energization of the valves 16, 24, 58, 60 and 66 is terminated. Thus, the target vehicle height control is accomplished.

On the other hand, if it is determined at step 225 that the dive condition is not set or that the acceleration difference ΔG is smaller than the preset acceleration ΔGo at step 235, the program proceeds to step 412. At this step, it is determined whether or not the condition is set to execute other rapid controls. If YES, other rapid controls are executed at step 413.

For an example of other rapid controls, an anti-squat control will be described. The squat condition for executing anti-squat control is defined as follows: the time required for passing through three of six divisions of the full range of the throttle opening detected by a throttle opening sensor of the engine (not shown) is less than a predetermined time interval (e.g., 80 msec); the differences among the vehicle heights detected by the vehicle height sensors 80, 82, 84 and 86 are within a preset value (e.g., 24 mm); the absolute value of a lateral acceleration Ga is smaller than a predetermined acceleration Gao (e.g., 0.3 g); the absolute value of the steering angle θ of the steering wheel 88 detected by the steering angle sensor 90 is smaller than a preset angle θo (e.g., 45°); the absolute value of the steering angle velocity $\dot{\theta}$ is smaller than a predetermined steering angle velocity $\dot{\theta}$o (e.g., 140°/sec). In the case that the acceleration difference ΔG between the maximum average longitudinal acceleration GMAX and the minimum average longitudinal acceleration GMIN detected within a predetermined time interval immediately after the determination of the squat condition is larger than a preset acceleration (e.g., 0.072 g), a correction amount C of the vehicle height as the control parameter corresponding to the difference ΔG is calculated. In response to this parameter C, the vehicle height is controlled so that the rear height is larger than the front height.

After the above-mentioned vehicle attitude control, the maximum acceleration $\overline{G}p$ of the average longitudinal acceleration G is detected in a manner similar to the aforementioned anti-dive control. After the maximum acceleration $\overline{G}p$ is attained and when the longitudinal acceleration G is decreased so that the average longitudinal acceleration $\overline{G}$ becomes less than a predetermined ratio γ (e.g., 70%) of the maximum acceleration $\overline{G}p$, the return control is executed in response to the correction amount C by following the procedure opposite to the vehicle attitude control. Moreover, when the absolute value of the average longitudinal acceleration G becomes less than a predetermined acceleration (e.g., 0.15 g), the valve-energization duty ratio corresponding to the average vehicle height $\overline{H}$ (=ΔH) is calculated. The individual valves are energized according to the calculated duty ratio. Accordingly, the attitude correction control after th attitude control and the return control can be executed during the anti-squat control as in the anti-dive control.

As a result of the above-mentioned controls, if it is determined at step 415 that the compressed air in the high pressure reserve tanks 28 and 32 is consumed so that the pressure PFH in the high pressure reserve tank 28 detected by the pressure sensor 34 or the pressure PRH in the high pressure reserve tank 32 detected by the pressure sensor 36 becomes less than a preset high-pressure interruption pressure Pa (e.g., 9.5 atms abs.), a rapid control interruption flag is set at step 420. The high-pressure interruption pressure Pa is a pressure at which the rapid attitude control cannot be carried out. At subsequent step 425, the compressor 10 which is driven by the compressor motor 9, the supply valve 22, one of the leveling vales 42, 44, 46 and 48, and the suction valve 76 are energized. Thus, the air in the low pressure reserve tanks 62 and 68 is compressed and supplied to one of the main air chambers 4FL, 4FR, 4RL or 4RR. When the air pressure in the low pressure reserve tanks 62 and 68 is lower than the atmospheric pressure, the external air is inhaled via the check valve 78, compressed by the compressor 10 and supplied to one of the main chambers 4FL, 4FR, 4RL or 4RR.

On the other hand, if the pressure PFH or PRH is equal to or larger than the high-pressure interruption pressure Pa (OFH or PRH≧Pa) at step 415 and moreover the rapid interruption flag has not been set at step 430, the program proceeds to step 435. At step 435, it is determined whether the pressure in the low pressure reserve tank 62 detected by the pressure sensor 70 or the pressure PRL in the low pressure reserve tank 68 detected by the pressure sensor 72 is larger tan a preset low-pressure interruption pressure Pb (e.g., 6 atms abs.) over which the aforementioned rapid attitude control cannot be executed. If the answer is YES at step 435, the process steps 420 and 425 rae executed.

On the other hand, if the rapid interruption flag is set at step 430, namely, if the compressor 10 and other valves have been energized, the program proceeds to step 440. At this step it is determined whether the pressure PFH in the high pressure reserve tank 28 and the pressure PRH in the high pressure reserve tank 32 are larger than a preset pressure Pc (e.g., 11 atms abs.) which is sufficient for executing the rapid attitude control. If the answer is NO, the routine is repeatedly executed through steps 420 and 425 until the pressures PFH and PRH become larger than the preset pressure Pc. If PFH and PRH exceeds Pc at step 440, the program proceeds to step 435.

If it is determined at step 435 that the aforementioned pressure PFL or PRL is lower than the low-pressure interruption pressure Pb and moreover the rapid control interruption flag has been set at step 445, the process step 450 is executed. At step 450, it is determined whether the pressures PFL and PRL in the low pressure reserve tanks 62 and 68 are equal to or less than a preset pressure Pd (e.g., 5 atms abs.) which is an upper tolerable pressure for executing the rapid controls and is smaller than the above mentioned low-pressure interruption pressure Pb. If the answer is NO, i.e., PFL and PRL exceeds Pd, steps 420 and 425 are executed. On the other hand, if the pressures PFL and PRL do not exceed the predetermined pressure Pd, the rapid control interruption flag is cleared at step 455, assuming that the pressures in the high pressure reserve tanks 28 and 32 are equal to or higher than the predetermined pressure Pc whereas the pressures in the low pressure reserve tanks 62 and 68 are equal to or lower than the predetermined pressure Pd so that the rapid attitude control can be executed. Subsequently, the energization of the compressor 10 which is driven by the compressor motor 9, the supply valve 22, the leveling vales 42, 44, 46 and 48 and the suction valve 76 is terminated at step 460. In the case that the rapid control interruption flag has not been set at step 445, the process steps 455 and 460 are executed. If either step 425 or 460 is executed, the program returns from this routine.

The process at step 230 acts as the acceleration difference calculation means and the processes at steps 235, 245 through 260 and 270 function as the attitude control means.

As previously stated, in the electronic controlled suspension system of the present embodiment, the acceleration difference ΔG, i.e., the difference between the maximum average longitudinal acceleration GMAX and the minimum average longitudinal acceleration GMIN within the predetermined time period tb immediately after the dive condition is set at step 225, is calculated at step 230. In response to the acceleration difference ΔG, the vehicle height correction amount C as a preset control parameter is obtained. The air springs 4FL, 4FR, 4RL and 4RR and the reserve tanks 28, 32, 62 and 68 are communicated and discommunicated in response to the vehicle height correction amount C in order to supply/discharge air in the air springs 4FL, 4FR, 4RL and 4RR to control the vehicle attitude (steps 235, 245 through 260 and 270). Since the vehicle attitude control is executed based on the acceleration difference ΔG, the increasing state of the acceleration can be accurately detected without inappropriately responding to a momentary change of the acceleration. Accordingly, a quick-responsive and accurate vehicle attitude control corresponding to the vehicle state can be realized, resulting in improved ride comfort and maneuverability of the vehicle.

Moreover, the vehicle attitude correction control is summarized as follows: the vehicle attitude is controlled by (step 225 through 270) making changes opposite to the vehicle attitude change; the maximum acceleration Gp as the maximum value of the average longitudinal acceleration $\overline{G}$ is detected (step 300); the return control is executed (step 330) when the longitudinal acceleration G is decreased and the average longitudinal acceleration $\overline{G}$ becomes lower than a preset ratio $\gamma$ of the maximum acceleration Gp (steps 300, 305, 315); the valve-energization duty ratio D is calculated (step 380) in response to the average vehicle height $\overline{H}$ ($=\Delta H$) of the individual vehicle height detected by the vehicle height sensors 80, 82, 84 and 86, when the absolute value of the average longitudinal acceleration $\overline{G}$ becomes lower than the preset acceleration G1, e.g., 0.15 g (step 360); and the individual valves are energized in response to the duty ratio D to execute the vehicle attitude correction control.

Since the vehicle attitude correction control is executed in accordance with the average vehicle height H ($=\Delta H$) when the longitudinal acceleration G is a small value having little influence on the vehicle attitude, the vehicle height can be accurately controlled to approach the standard vehicle height after the return control. Consequently, ride comfort and maneuverability of the vehicle can be improved.

Moreover, since the valve-energization duty ratio D is changed, i.e., the valve opening time is changed, in response to the average vehicle height $\overline{H}$ ($=\Delta H$), the valve opening time can be extended when the average vehicle height $\overline{H}$ is a large value so as to rapidly correct the vehicle height. On the other hand, if the average vehicle height H is small, the valve opening time can be shortened to slowly and steadily correct the vehicle height.

Figure 19:
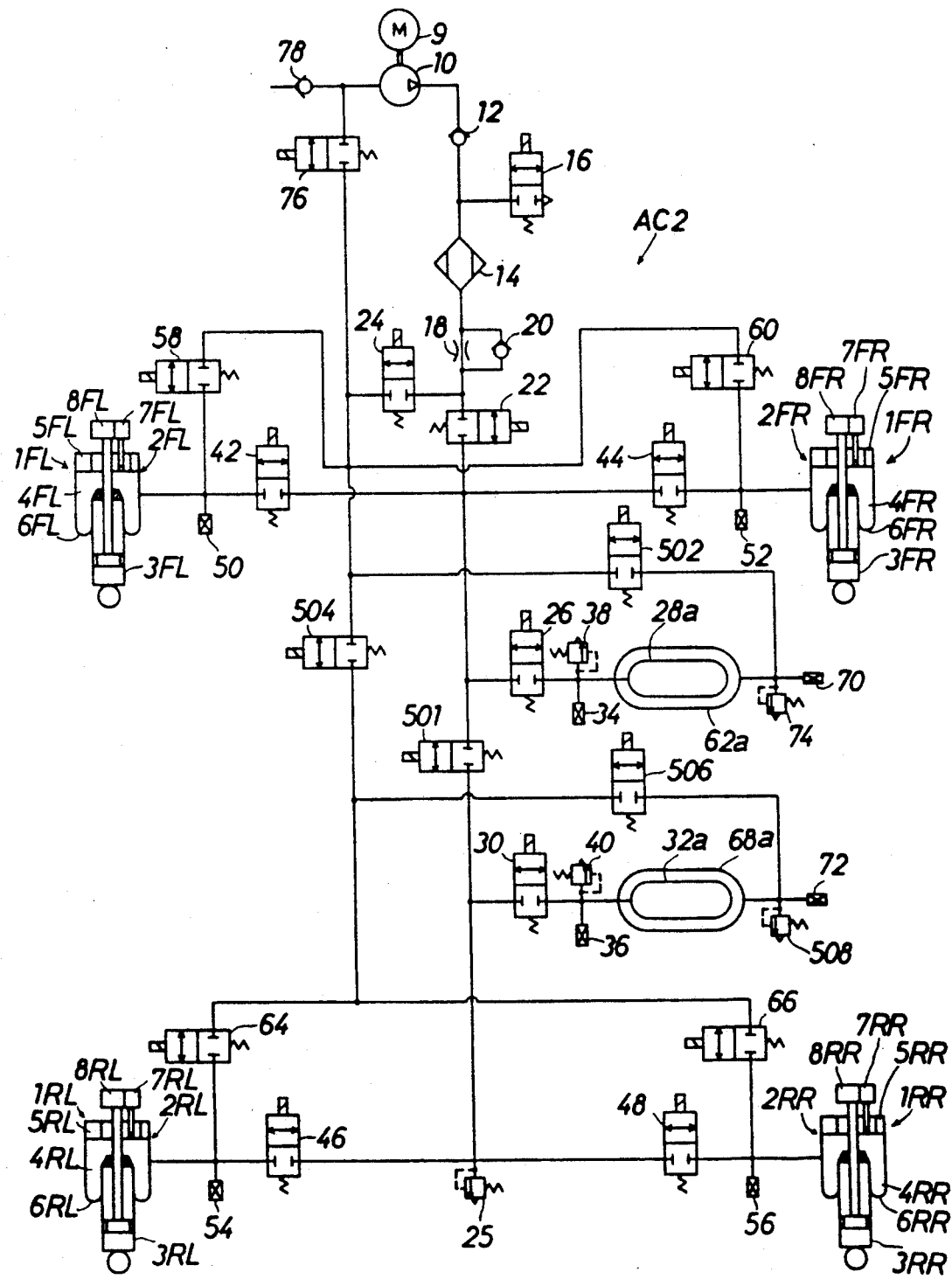
FIG. 19 is an air circuit diagram of another embodiment of the present invention.

Reference is now made to FIG. 19. Set forth is the explanation of an air circuit AC2 in another embodiment different from that shown in FIG. 3. In this air circuit AC2, the same components as those of the air circuit AC are designated by the same reference numerals.

In the air circuit AC2, a high pressure reserve tank 28a and a low pressure reserve tank 62a at the front side as well as a high pressure reserve tank 32a and a low pressure reserve tank 68a at the rear side are made integral. One side of the high pressure reservoir valve 26 connected to the front high pressure reserve tank 28a and the high pressure reservoir valve 30 connected to the rear high pressure reserve tank 32a are connected to each other through a communication valve 501 for establishing and blocking the communication. As a result, even if the two high pressure reservoir valves 26 and 30 are simultaneously energized, no communication is established between the two high pressure reserve tanks 28a and 32a unless the communication valve 501 is energized.

Moreover, the front low pressure reserve tank 62a is connected to one side of a low pressure reservoir valve 502 for establishing and blocking the communication, the other side of the valve 502 is connected to the suction valve 76 and the two front discharge valves 58 and 60 and to one side of a communication valve 504 for establishing and blocking the communication. The other side of this communication valve 504 is connected to the low pressure reserve tank 68a through a low pressure reserve valve 506 for providing and blocking the communication and to the two rear discharge valves 64 and 66. Furthermore, the low pressure reserve tank 68a is connected to a relief valve 508 which is set to operate at a predetermined pressure. As a result, the low pressure reserve tanks 62a and 68a have their communications blocked from other valves by the low pressure reservoir valves 502 and 506 so that they do not communicate with each other until the communication valve 504 is energized, even if the two low pressure reservoir valves 502 and 506 are energized.

This air circuit AC2 allows the main air chambers 4FL and 4FR and the low pressure reserve tank 62a to communicate with each other by energizing the low pressure reservoir valve 502 and the discharge valves 58 and 60 at the front side. Moreover, the main air chambers 4RL and 4RR and the low pressure reserve tank 68a are enabled to communicate by energizing the low pressure reservoir valve 506 and the main air chambers 4RL and 4RR at the rear side.

In the air circuit AC2, the high pressure reserve tanks 28a and 32a and the low pressure reserve tanks 62a and 68a are respectively equipped with the high pressure reservoir valves 26 and 30, the low pressure reservoir valves 502 and 506, and the communication valves 501 and 504 so as to control the pressure for each of the reserve tanks 28a, 32a, 62a and 68a.

While the preferred embodiments of the present invention have been described, it is to be understood that modifications will be apparent to those skilled in the art without departing from the spirit of the invention. The scope of the invention, therefore, is to be determined solely by the following claims.

What is claimed is:

1. An electronic controlled fluid suspension system for a vehicle to reduce diving during braking and squatting during acceleration comprising:
   a fluid suspension (M2) provided for a wheel (M1) of the vehicle;
   flow control means (M3) for controlling fluid flow to and form the fluid suspension (M2) based on a control parameter;
   acceleration detection means (M4) for detecting longitudinal acceleration of the vehicle;
   difference calculation means (M5) for calculating a difference between a maximum value and a minimum value of detected longitudinal acceleration during a predetermined time interval; and
   attitude control means (M6) for generating the control parameter based on the difference calculated in the difference calculation means (M5) so as to cause a longitudinal attitude of the vehicle to approach a predetermined optimum target attitude that is lower at both a front part and a rear part of the vehicle than an original attitude.

2. The electronic controlled fluid suspension system according to claim 1, wherein the control parameter consists of values corresponding to vehicle height changes at the front part and the rear part of the vehicle and the flow control means controls the fluid flow to realize the vehicle height changes at the front part and the rear part of the vehicle.

3. The electronic controlled fluid suspension system according to claim 2, wherein:
   the attitude control means generates the control parameter when the deference calculated in the difference calculation means is greater than a predetermined value; and
   the control parameter generated in the attitude control means corresponds to an amount of the difference.

4. The electronic controlled fluid suspension system according to claim 3, wherein the fluid suspension system further comprises:

return control means for generating a return control parameter that has an effect opposite to that of the control parameter on the flow control means so as to cause the vehicle to approach the original attitude of the vehicle after the vehicle attitude is controlled to approach the target vehicle attitude;

vehicle height detection means for detecting vehicle heights at a front part and a rear part of the vehicle; and attitude correction control means for generating a correction control parameter when the detected longitudinal acceleration is less than a second predetermined value, the second predetermined value being smaller than the predetermined value, the correction control parameter being determined based on differences between the detected front and rear vehicle heights and corresponding vehicle heights at the original attitude so as to cause the flow control means to completely return the attitude of the vehicle to the original attitude.

5. The electronic controlled fluid suspension system according to claim 3, wherein:

the acceleration detection means detects the longitudinal acceleration repeatedly at a first preset time interval; and the difference calculation means comprises (a) averaging means for calculating an average value of the detected longitudinal acceleration within a second preset time interval, the second preset time interval being longer than the first preset time interval, and (b) a difference calculator for calculating a difference between a maximum and a minimum of the average values during the predetermined time interval, the predetermined time interval being longer than the second preset time interval.

6. The electronic controlled fluid suspension system according to claim 5, wherein:

the fluid suspension system further comprises a vehicle speed sensor, a lateral acceleration sensor, a brake switch for sensing brake pedal operation, a steering angle sensor, and an anti-dive control condition determination means for generating an anti-dive control signal when a vehicle speed detected by the vehicle speed sensor is greater than a first preset value, a lateral acceleration detected by the lateral acceleration sensor is smaller than a second preset value, the brake pedal is operated, a steering angle detected by the steering angle sensor is smaller than a third preset value and a steering angle change rate calculated from the detected steering angle is smaller than a fourth preset value; and the attitude control means (M6) generates the control parameter when the anti-dive control signal is generated at the anti-dive control condition determination means and when the difference calculated by the difference calculation means is greater than the predetermined value.

7. The electronic controlled fluid suspension system according to claim 5, wherein:

the fluid suspension system further comprises a throttle opening sensor, a plurality of vehicle height sensors each provided for a wheel, a lateral acceleration sensor, a steering angle sensor, and an anti-squat control condition determination means for generating an anti-squat control signal when a throttle opening change rate calculated rom a throttle opening detected by the throttle opening sensor is greater than a first preset value, a maximum difference among vehicle heights detected by the plurality of vehicle height sensors is less than a second preset value, a lateral acceleration detected by the lateral acceleration sensor is smaller than a third preset value, a steering angle detected by the steering angle sensor is smaller than a fourth preset value and a steering angle change rate calculated from the detected steering angle is smaller than a fifth preset value; and the attitude control means (M6) generates the control parameter when the anti-squat control signal is generated at the anti-squat control condition determination means and when the difference calculated by the difference calculation means is greater than the predetermined value.

8. In an electronically-controlled fluid suspension system for a vehicle having a fluid suspension provided for a wheel of the vehicle and flow control means for controlling fluid flow to and from the fluid suspension as a function of a control parameter, the improvement to reduce diving during braking and squatting during acceleration comprising:

acceleration detection means for detecting longitudinal acceleration and deceleration of the vehicle;

difference calculation means for calculating a difference between a maximum value and a minimum value of detected longitudinal acceleration occurring during a predetermined time interval; and, attitude control means for generating the control parameter as a function of the difference calculated in the difference calculation means so as to cause longitudinal attitude of the vehicle to approach a predetermined optimum target attitude that is below an original attitude at both a front part and a rear part of the vehicle.

9. The improvement to an electronically-controlled fluid suspension system of claim 8, wherein:

the control parameter consists of values corresponding to vehicle height changes at the front part and the rear part of the vehicle; and, the flow control means controls the fluid flow to cause the vehicle height changes at the front part and the rear part of the vehicle.

10. The improvement to an electronically-controlled fluid suspension system of claim 9, wherein:

the attitude control means generates the control parameter when the difference calculated in the difference calculation means is greater than a predetermined value; and the control parameter generated in the attitude control means corresponds to a proportional amount of the difference.

11. The improvement to an electronically-controlled fluid suspension system according to claim 10, wherein the fluid suspension system further comprises:

return control means for generating a return control parameter that has an effect opposite to that of the control parameter on the flow control means so as to cause the vehicle to attitude control means (M6) for generating the control parameter based on the difference calculated in the difference calculation means (M5) so as to cause a longitudinal attitude of the vehicle to approach a predetermined optimum target attitude that is lower at both a front part and a rear part of the vehicle than an original attitude.

12. The improvement to an electronically-controlled fluid suspension system of claim 10, wherein:
the acceleration detection means detects the longitudinal acceleration repeatedly at a first preset time interval; and
the difference calculation means comprises:
averaging means for calculating an average value of the detected longitudinal acceleration within a second preset time interval, the second preset time interval being longer than the first preset time interval, and
difference calculator means for calculating a difference between a maximum and a minimum of the average values during the predetermined time interval, the predetermined time interval being longer than the second preset time interval.

13. The improvement to an electronically-controlled fluid suspension system according to claim 12, wherein the fluid suspension system further comprises:
a vehicle speed sensor;
a lateral acceleration sensor;
a brake switch for sensing brake pedal operation;
a steering angle sensor; and
anti-dive control condition determination means for generating an anti-dive control signal when vehicle speed is greater than a first preset value, lateral acceleration is smaller than a second preset value, the brake pedal is operated, a steering angle detected is smaller than a third preset value, and a steering angle change rate calculated from the detected steering angle is smaller than a fourth preset value; and wherein additionally,
the attitude control means generates the control parameter when the anti-dive control signal is generated at the anti-dive control condition determination means and when the difference calculated by the difference calculation means is greater than the pre-determined value.

14. The improvement to an electronically-controlled fluid suspension system of claim 12, wherein the fluid suspension system further comprises:
a throttle opening sensor;
a plurality of vehicle height sensors provided for respective ones of wheels on the vehicle;
a lateral acceleration sensor;
a steering angle sensor; and,
anti-squat control condition determination means for generating an anti-squat control signal when a throttle opening change rate is greater than a first preset value, a maximum difference among vehicle heights detected by the plurality of vehicle height sensors is less than a second preset value, a lateral acceleration detected by the lateral acceleration sensor is smaller than a third preset value, a steering angle detected by the steering angle sensor is smaller than a fourth preset value, and a steering angle change rate calculated from the detected steering angle is smaller than a fifth preset value; and wherein additionally,
the attitude control means generates the control parameter when the anti-squat control signal is generated at the anti-squat control condition determination means and when the difference calculated by the difference calculations means is greater than the pre-determined value.

* * * * *